(12) United States Patent
Ishihara

(10) Patent No.: US 6,817,848 B2
(45) Date of Patent: Nov. 16, 2004

(54) MOLD FOR MOLDING A TIRE

(75) Inventor: Yasuyuki Ishihara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 104 days.

(21) Appl. No.: 09/991,061

(22) Filed: Nov. 21, 2001

(65) Prior Publication Data

US 2002/0071880 A1 Jun. 13, 2002

(30) Foreign Application Priority Data

Dec. 7, 2000 (JP) ............................. 2000-373594
Sep. 11, 2001 (JP) ............................. 2001-275807

(51) Int. Cl.⁷ ................................................ B29C 35/02
(52) U.S. Cl. ................... 425/28.1; 425/35; 425/812; 249/141
(58) Field of Search ...................... 425/28.1, 35, 812; 249/141

(56) References Cited

U.S. PATENT DOCUMENTS

| 2,290,510 | A | * | 7/1942 | Talalay | 249/141 |
| 2,865,052 | A | * | 12/1958 | Wilcox | 249/141 |
| 3,891,363 | A | | 6/1975 | Sievers et al. | 425/28.1 |
| 4,492,554 | A | * | 1/1985 | Carter | 425/812 |
| 4,740,145 | A | * | 4/1988 | Shurman | 425/812 |
| 5,922,237 | A | * | 7/1999 | Green | 425/812 |
| 5,939,101 | A | * | 8/1999 | Green | 425/812 |
| 6,280,176 | B1 | * | 8/2001 | Boyce et al. | 425/812 |
| 6,561,779 | B2 | * | 5/2003 | Nitsch et al. | 425/812 |

FOREIGN PATENT DOCUMENTS

| DE | 195 43 276 C1 | | 2/1997 |
| DE | 198 33 730 | * | 2/2000 |
| EP | 0 774 333 B1 | | 5/1997 |
| GB | 1 211 613 A | | 11/1970 |
| JP | 2-214616 | * | 8/1990 |
| JP | 9-141660 | | 6/1997 |

* cited by examiner

Primary Examiner—James P. Mackey
(74) Attorney, Agent, or Firm—Burr & Brown

(57) ABSTRACT

A mold for molding a tire is provided, including at least two sub-molds that form a predetermined form as a whole when used for molding a tire. Each of the sub-molds has a venthole for discharging air from blockades formed between the surface of a green tire and that of the sub-mold when the green tire is pressed on the surface of the sub-mold, and a ventlid made of a flexible member and having a lid mechanism capable of discharging air from the blockades while preventing the green tire from flowing out therefrom.

23 Claims, 33 Drawing Sheets

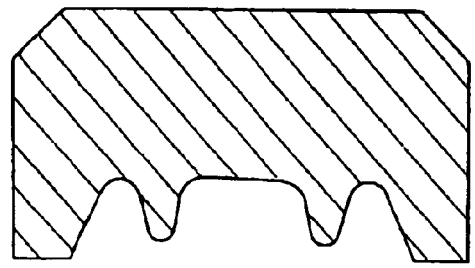
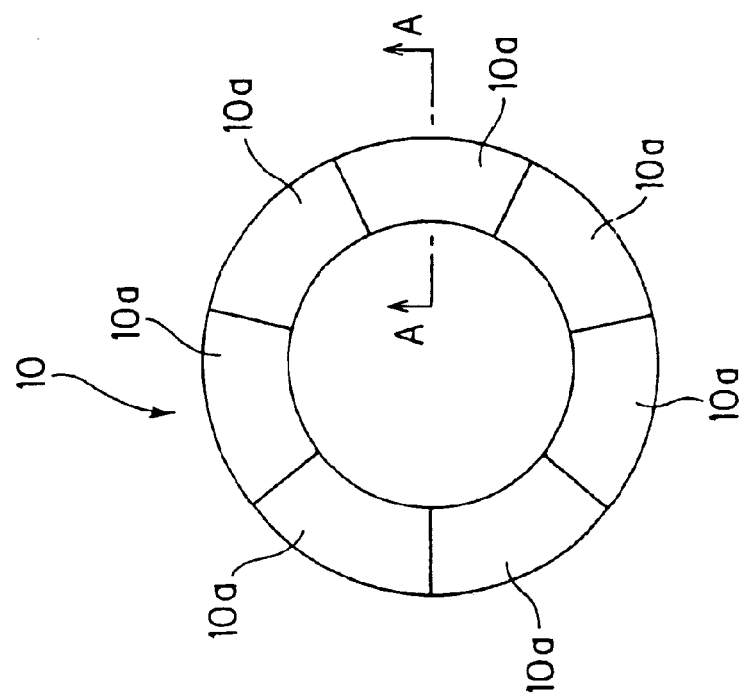
FIG. 1(b)
FIG. 1(a)

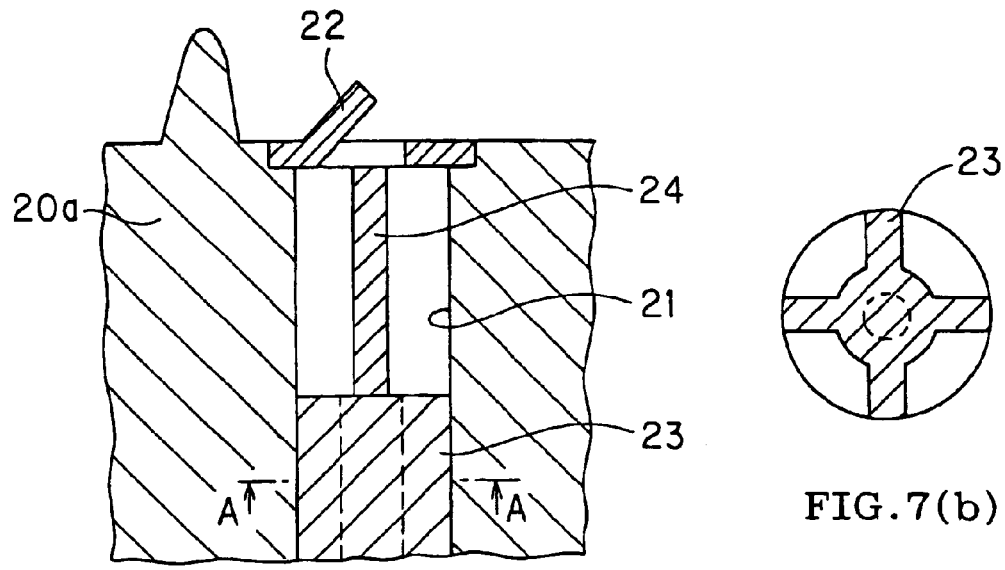
FIG.7(a)
FIG.7(b)
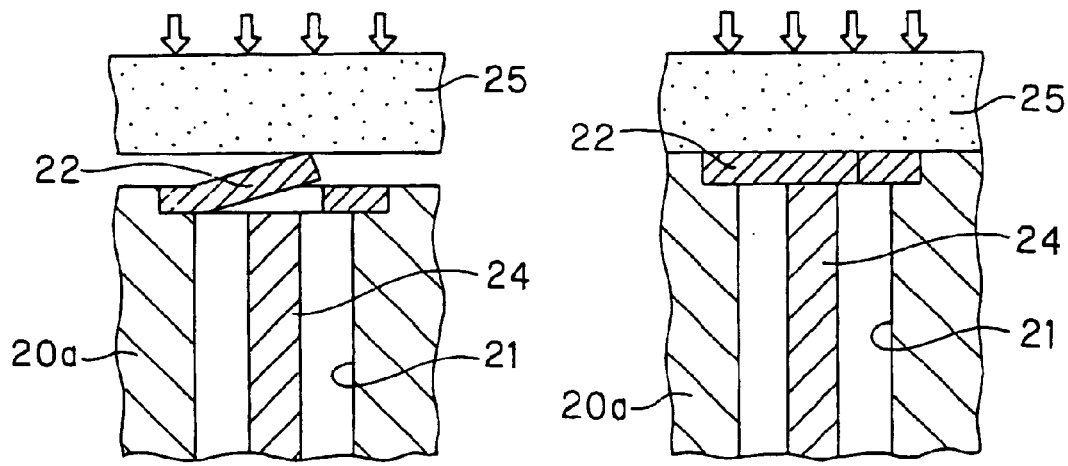
FIG.7(c)
FIG.7(d)

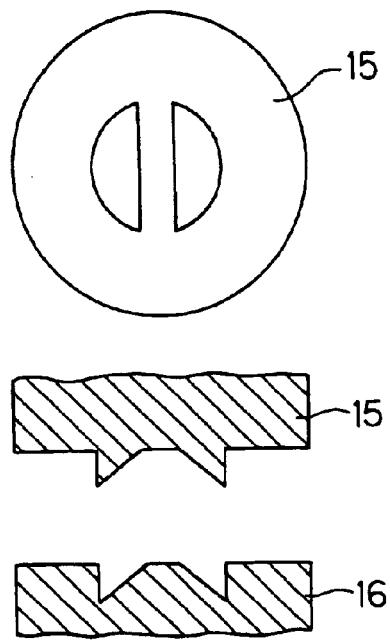
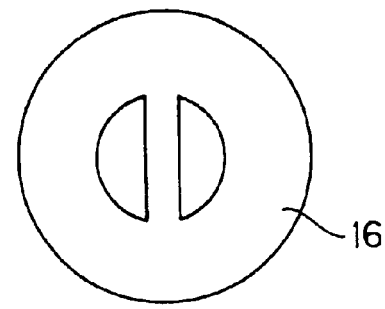
FIG.9(a)
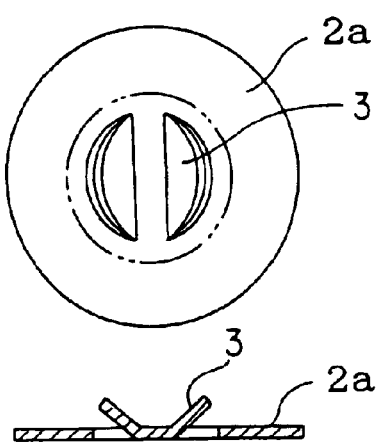
FIG.9(e)
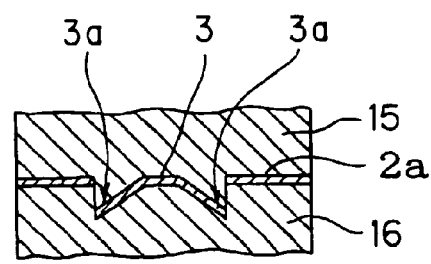
FIG.9(b)
FIG.9(c)
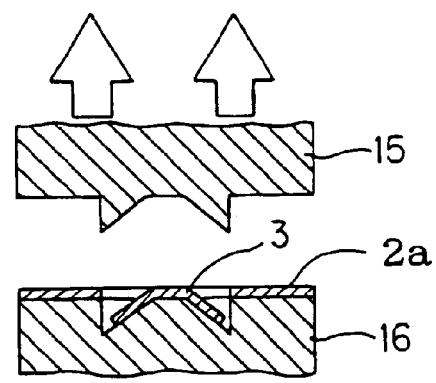
FIG.9(d)

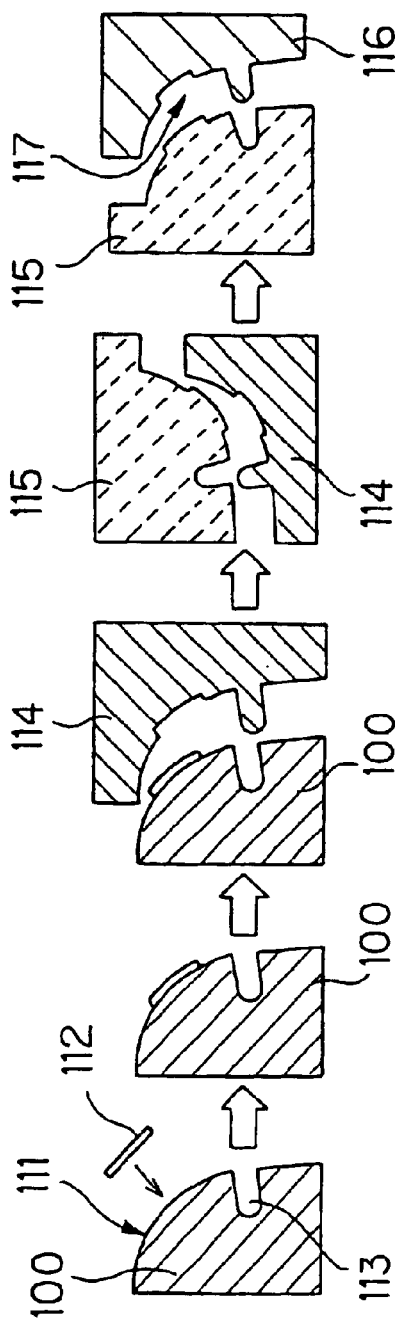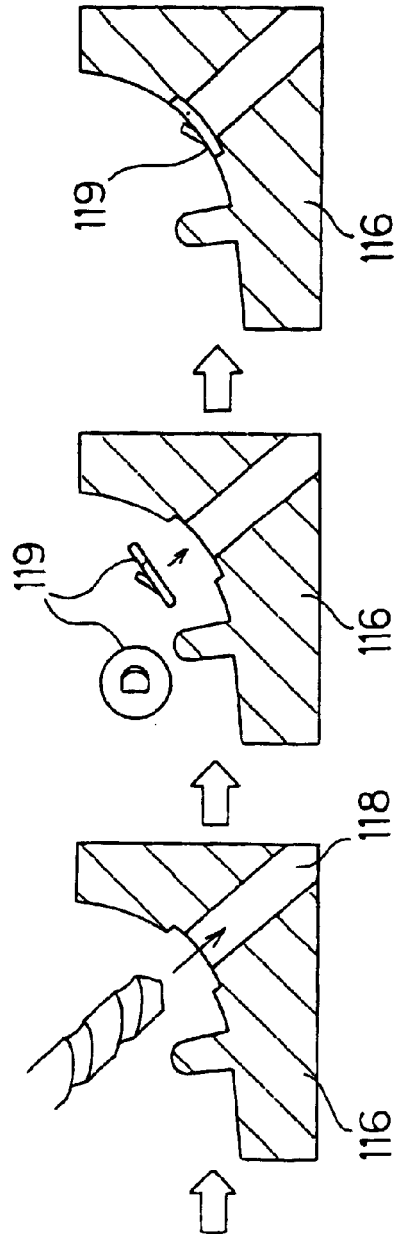

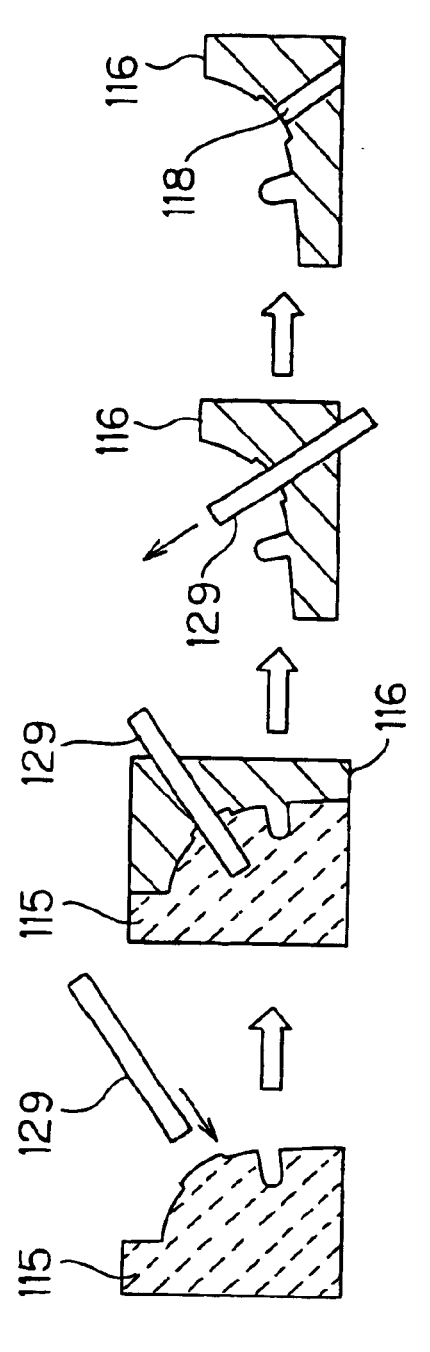

FIG.13
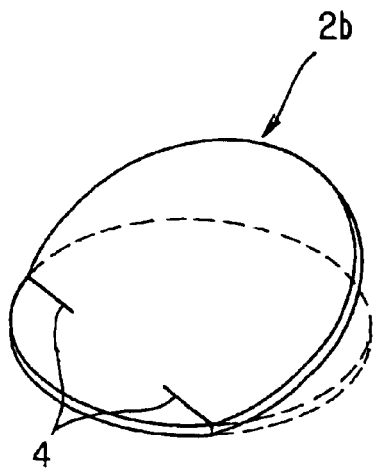
FIG.14(a)      FIG.14(b)
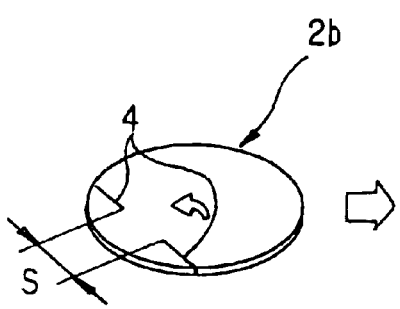 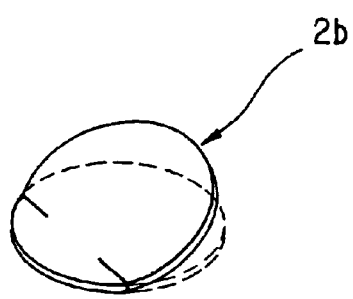
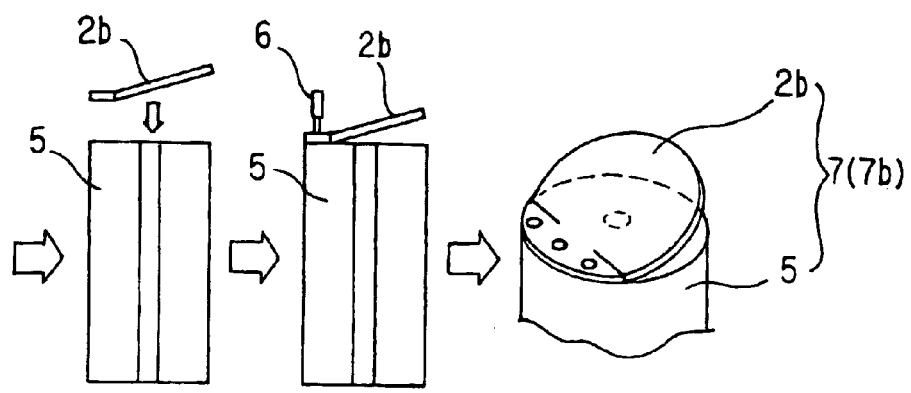
FIG.14(c)    FIG.14(d)    FIG.14(e)

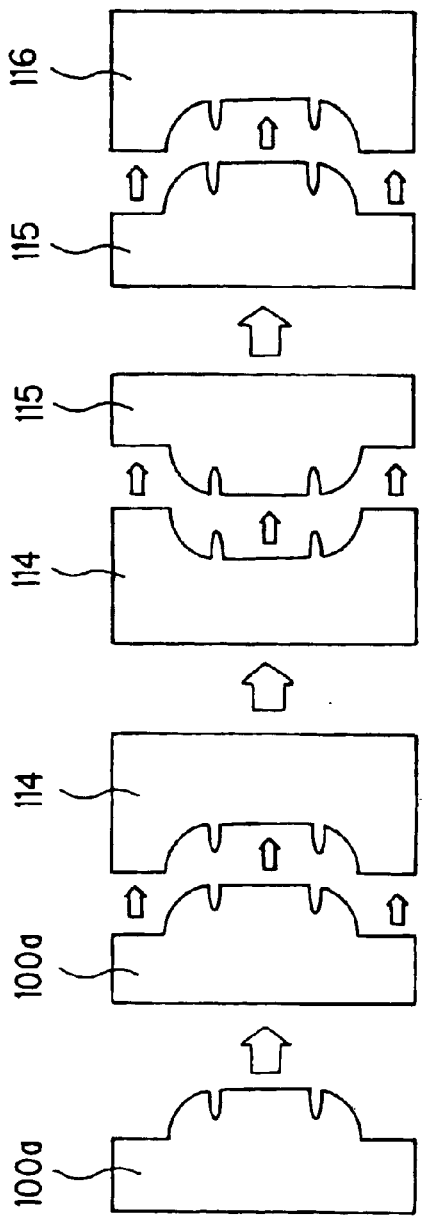
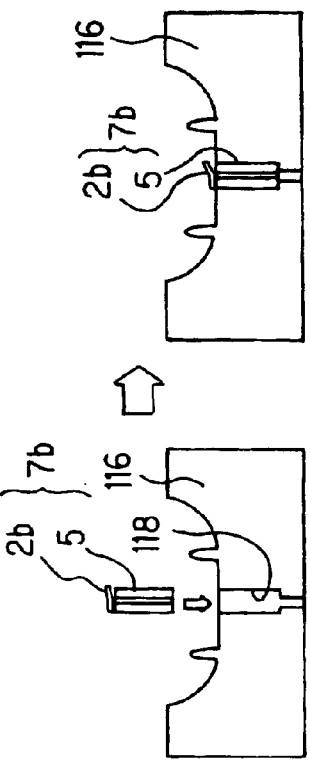
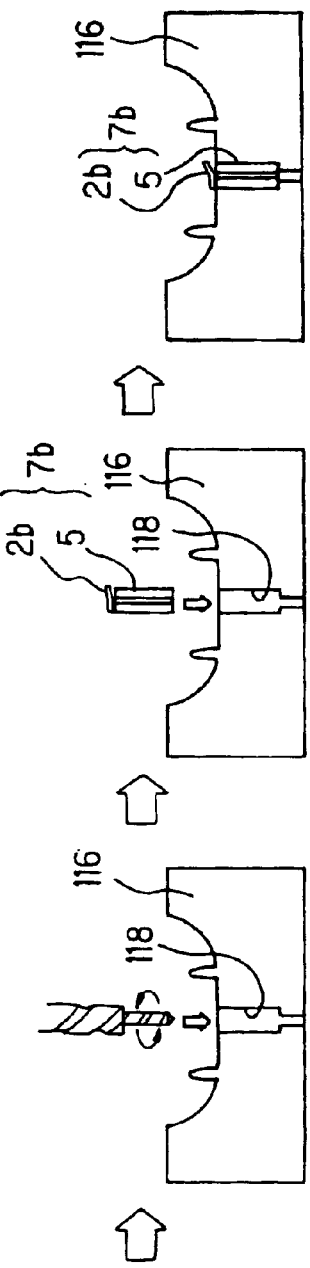

FIG. 17
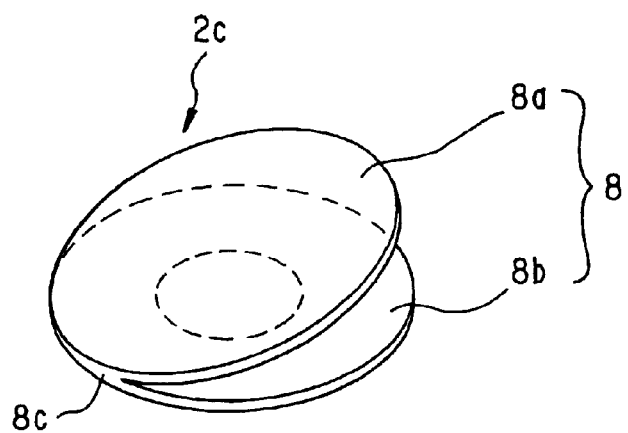
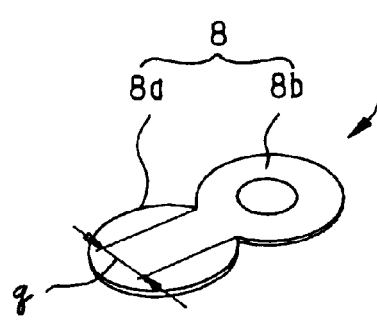
FIG. 18(a)
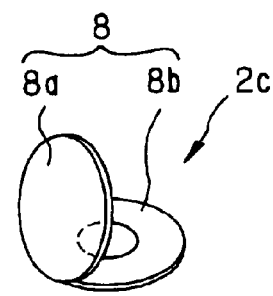
FIG. 18(b)
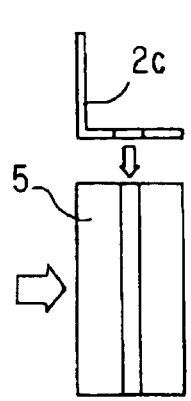
FIG. 18(c)
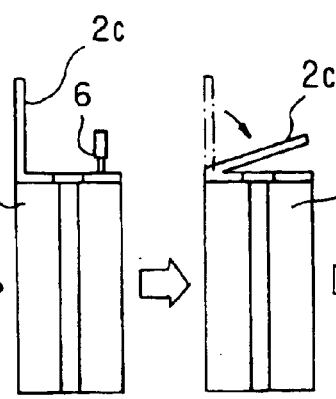
FIG. 18(d)  FIG. 18(e)
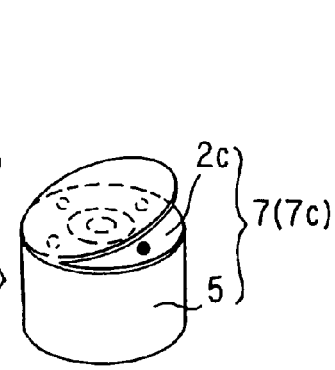
FIG. 18(f)

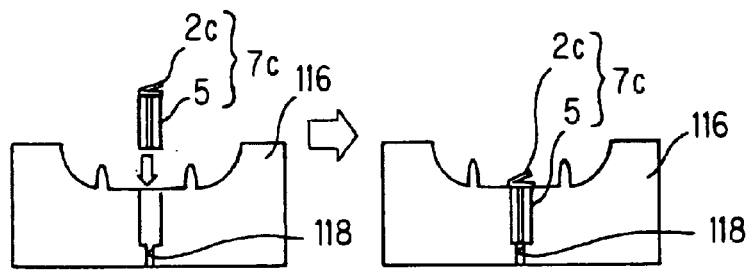
FIG.19(a)        FIG.19(b)
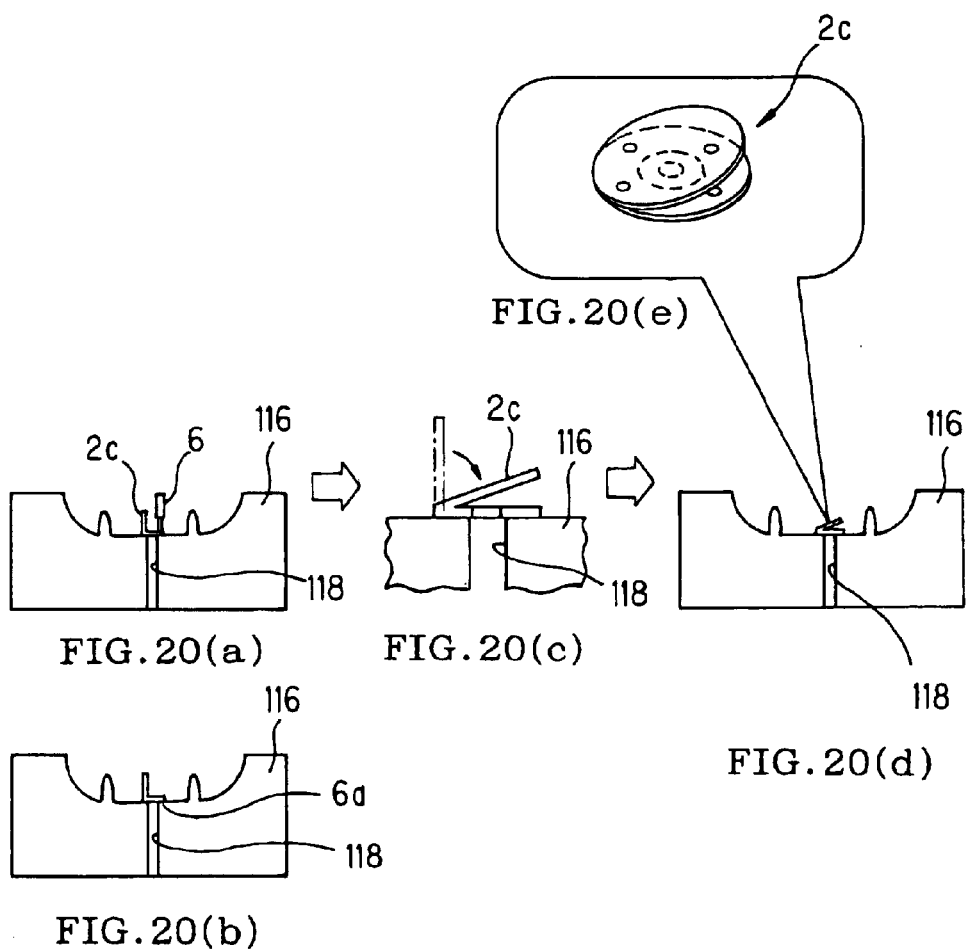
FIG.20(e)
FIG.20(a)   FIG.20(c)
FIG.20(b)   FIG.20(d)

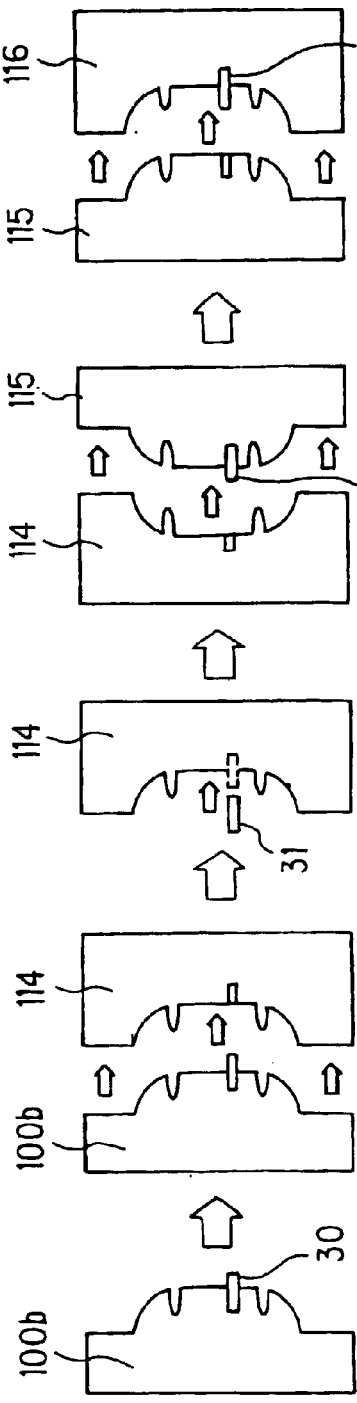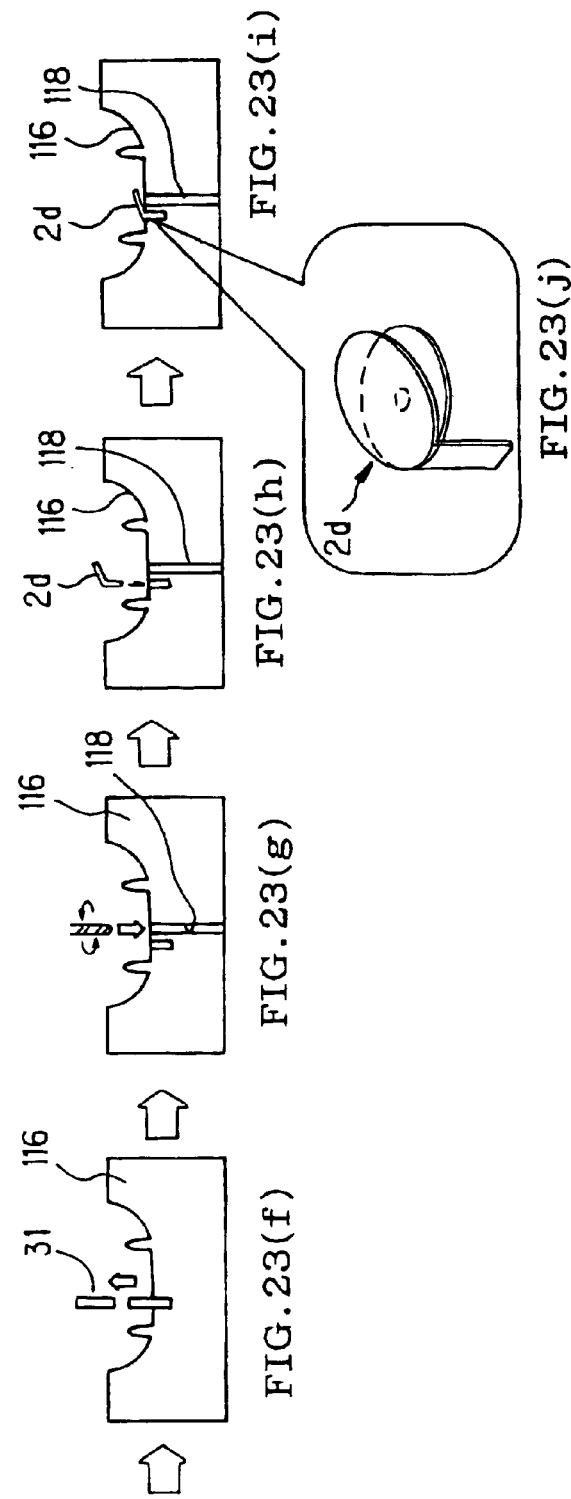

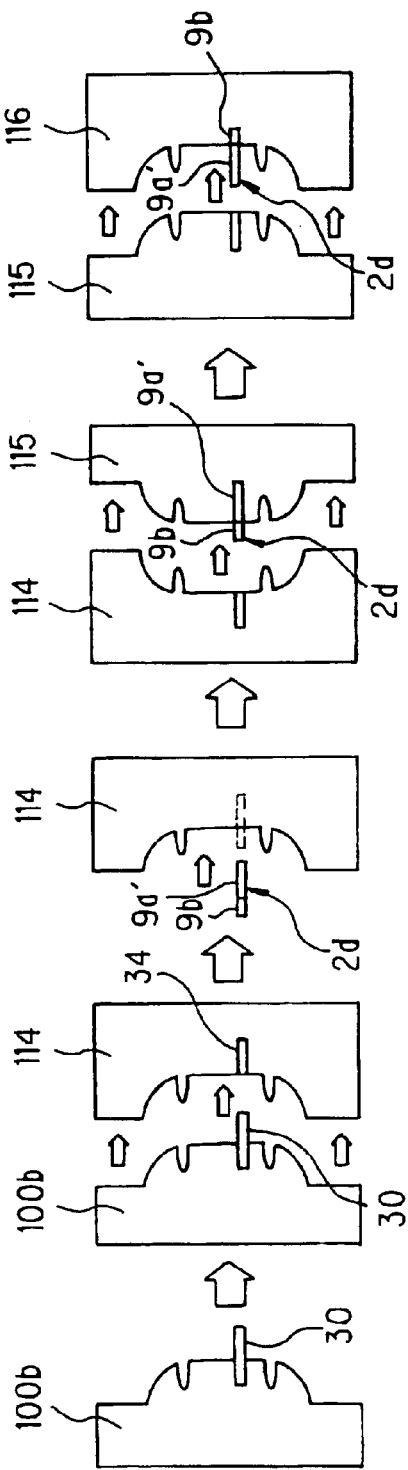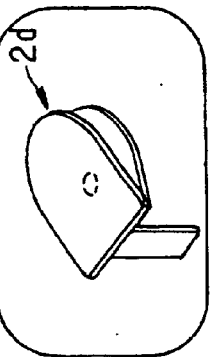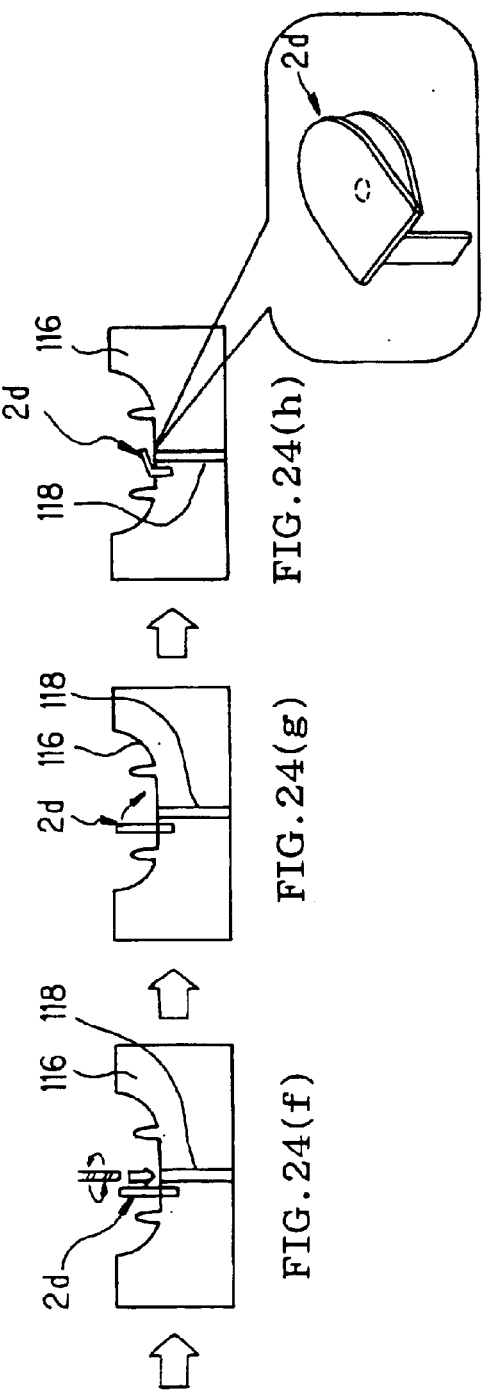

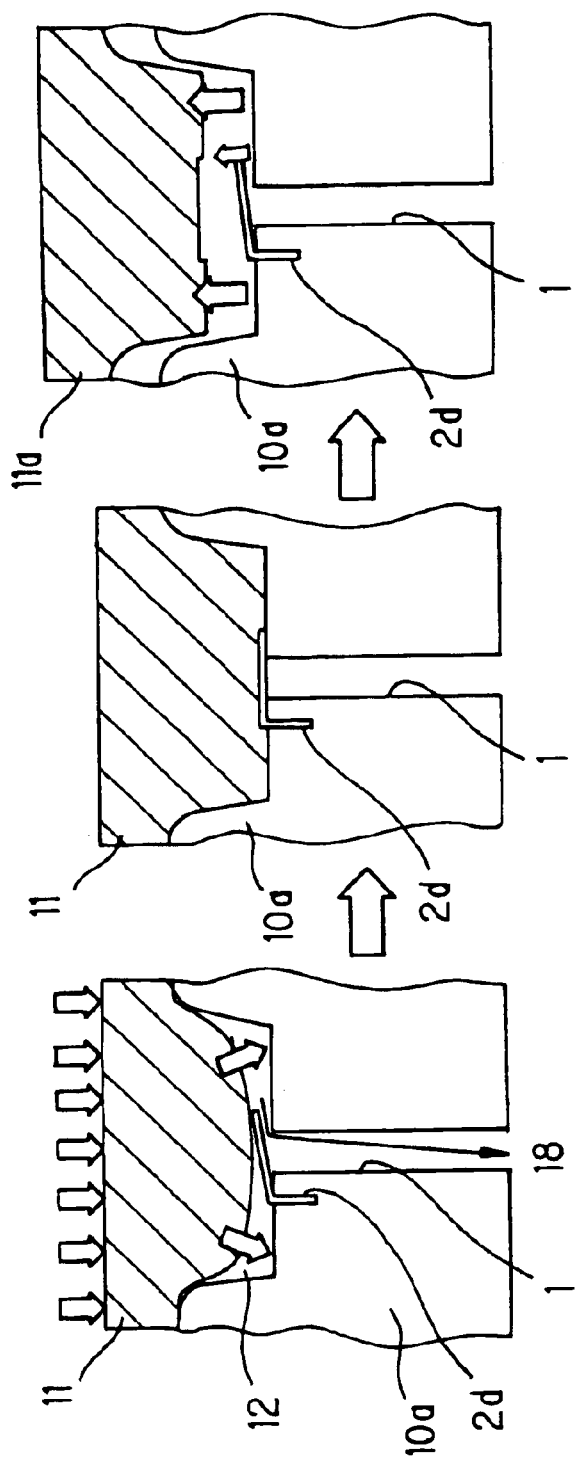

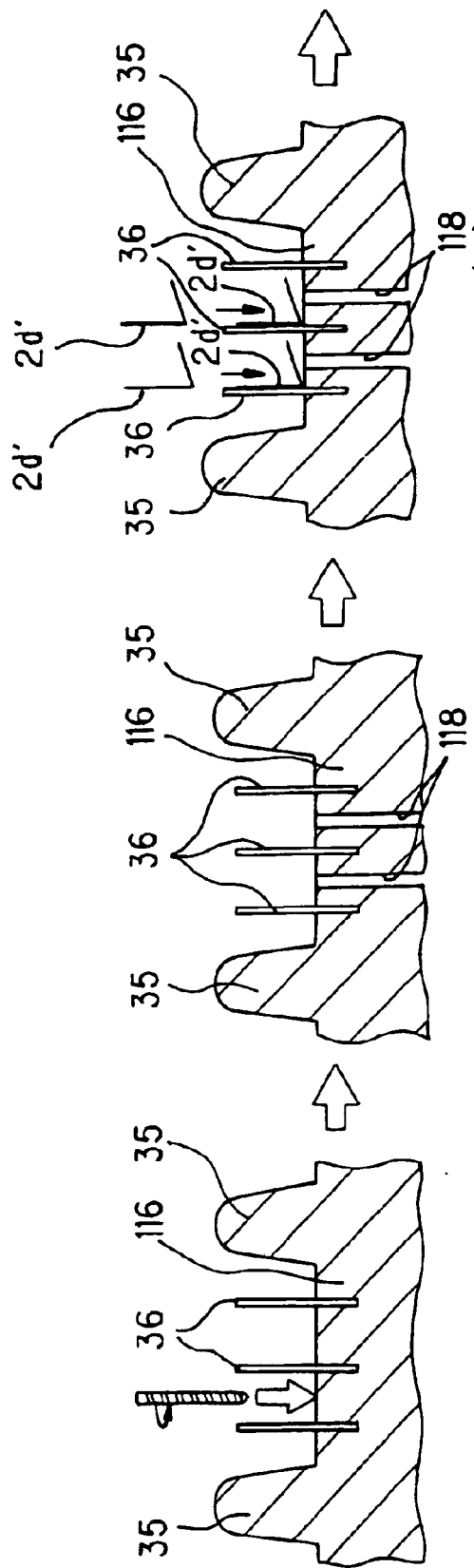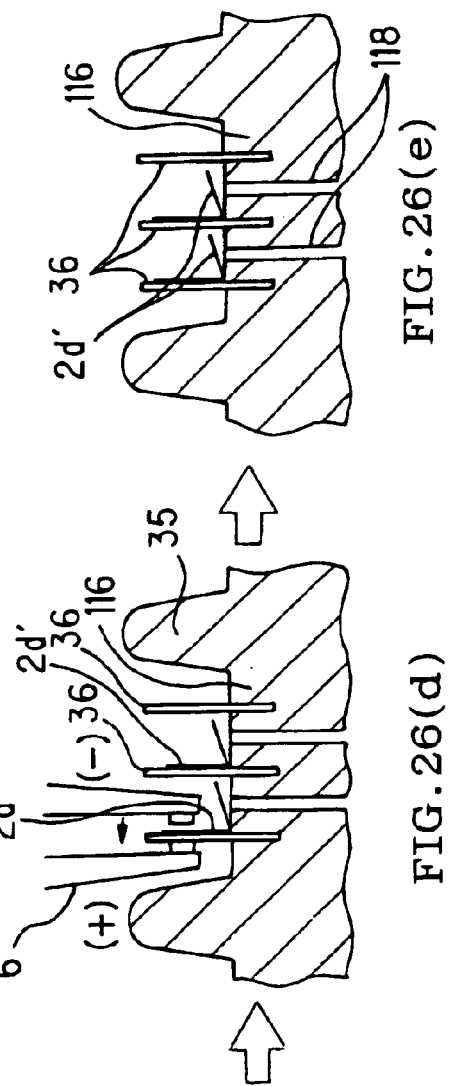

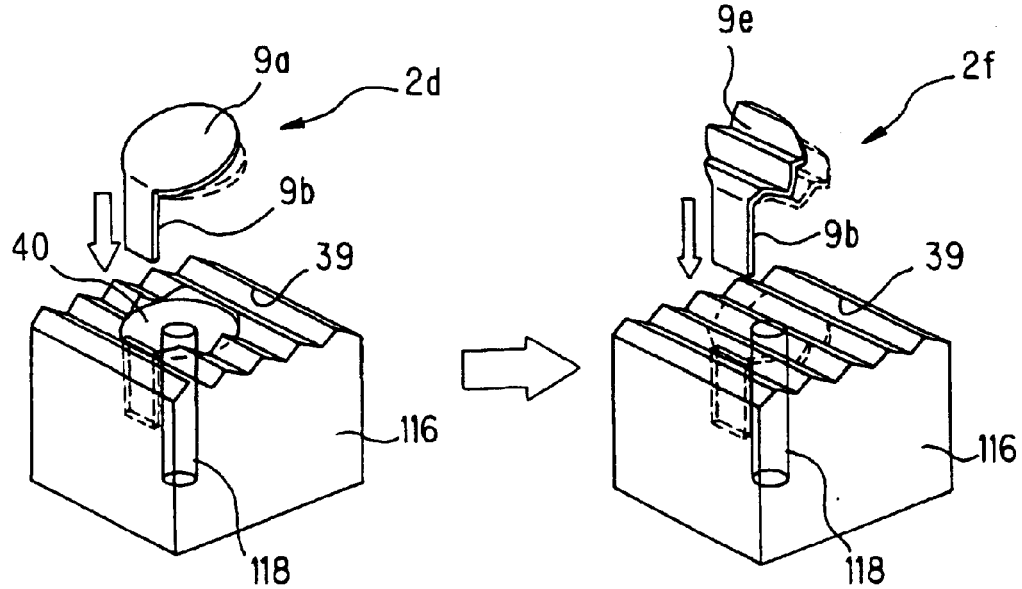
FIG.29(a)  FIG.29(b)
FIG.30
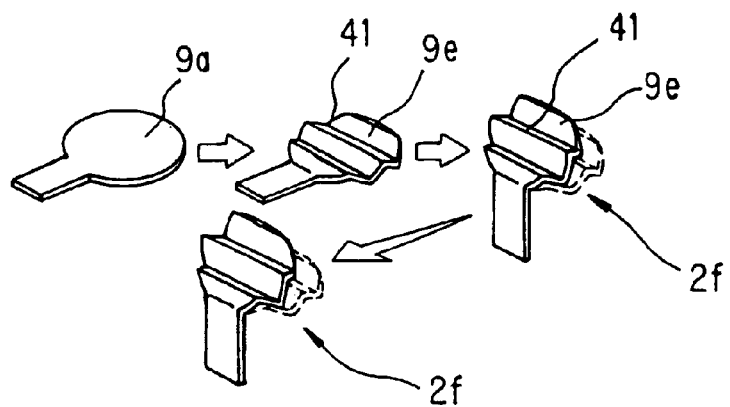

FIG.31
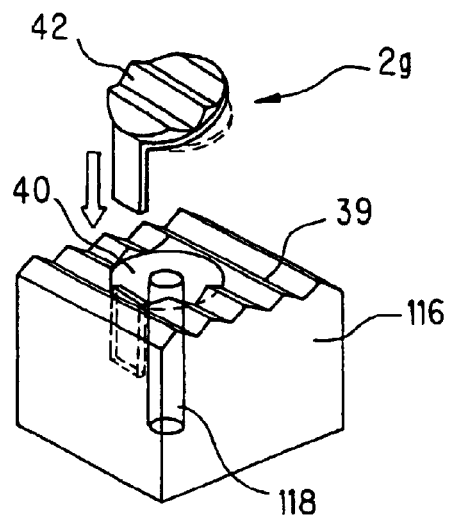
FIG.32
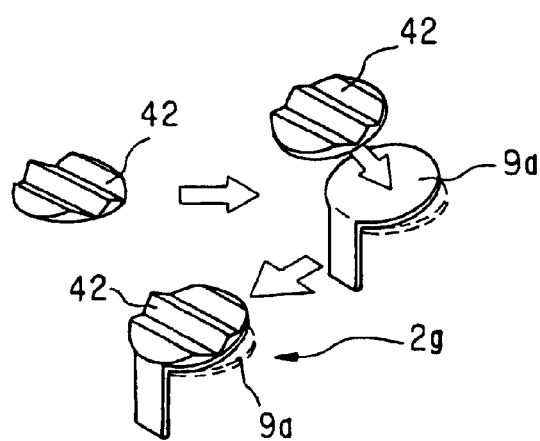
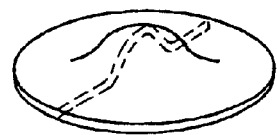
FIG.33(a)
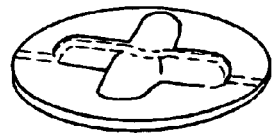
FIG.33(b)

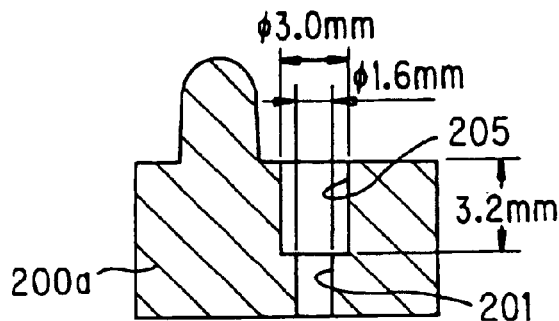
FIG.34(a)
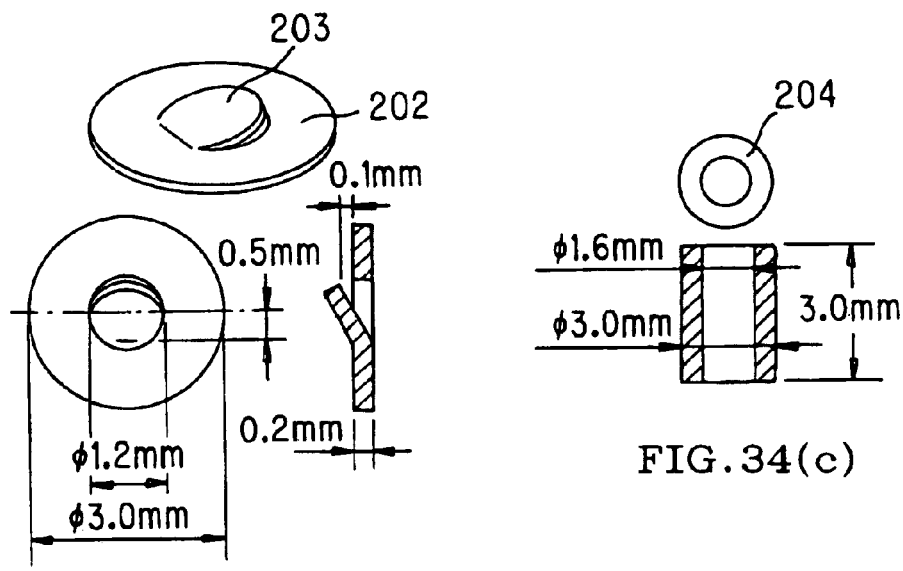
FIG.34(b)
FIG.34(c)
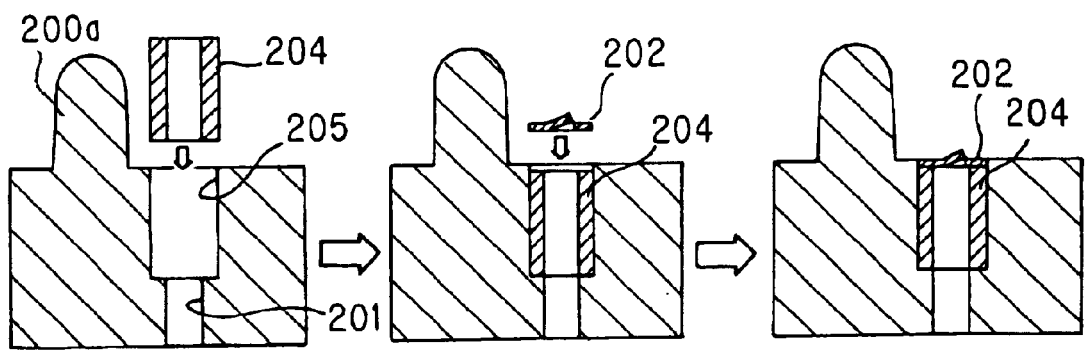
FIG.34(d)　　FIG.34(e)　　FIG.34(f)

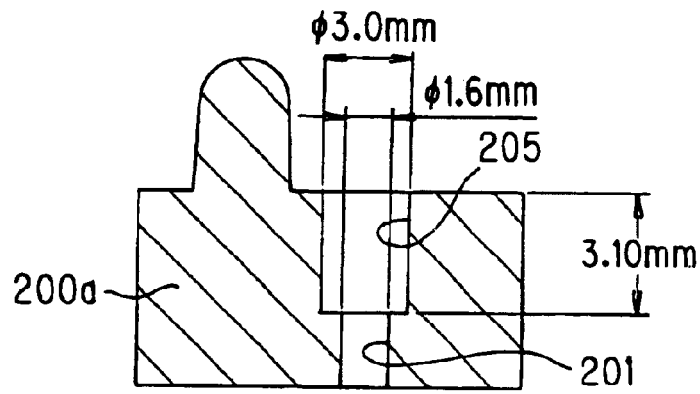
FIG.35(a)
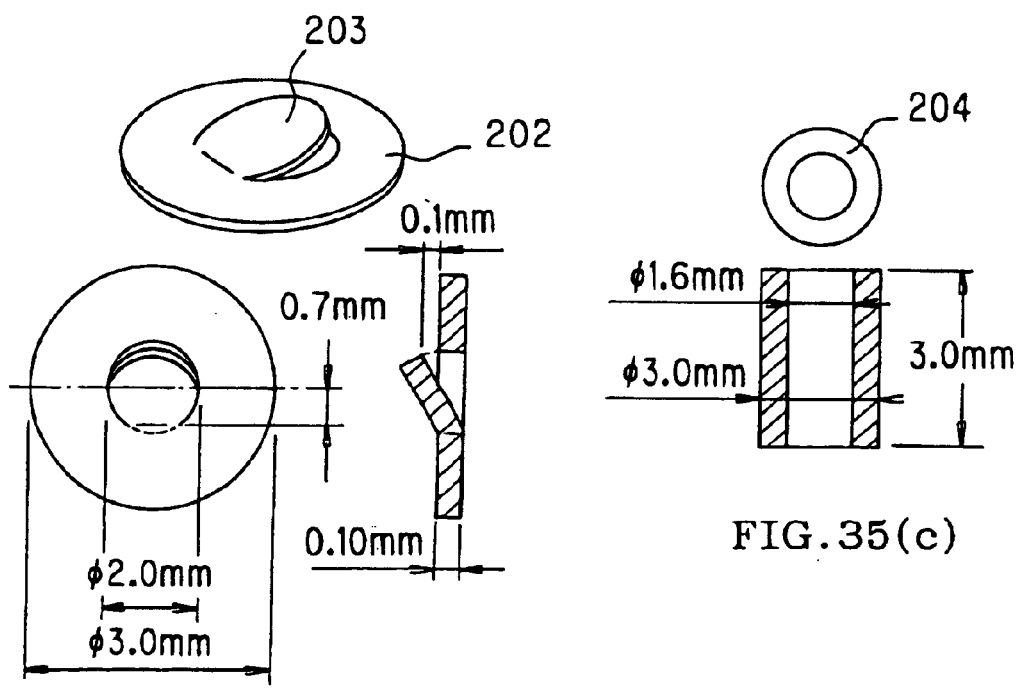
FIG.35(b)
FIG.35(c)

MOLD FOR MOLDING A TIRE

BACKGROUND OF THE INVENTION

(1) Field of the Invention

The present invention relates to a mold for molding a tire. More particularly, the present invention relates to a mold for molding a tire to prevent spew (whisker projections) and burred extensions on a tire surface during tire molding, to allow the retention of the initial performance of a tire obtained and good external appearance, and to allow designing for reduction in the number of molds and their production costs as well as simplification of maintenance and inspection work.

(2) Related Art Statement

The molds for molding a tire are often manufactured by means of casting which fits for the forming of complicated shapes conforming to the surface shape designed as complicated shapes having numerous thin projections termed sharp corners or blades for a tire.

Molds for molding a tire manufactured by means of this casting are ordinarily divided into sub-molds, and these sub-molds are combined to form a predetermined form as a whole at the time of forming a tire. As a method for dividing the mold, a method for dividing into 7–11 sub-molds by cutting the predesigned form in the direction of the central axis along the circumference which are often called segmented molds (or sectional molds), and a method for dividing into 2 sub-molds by cutting the predesigned form in a direction perpendicular to the central axis, that is, in the direction of the tire diameter which are often called 2-piece molds (or One Cast Ring molds). Appropriate selection can be made in accordance with manufacturing conditions and the like.

Molding of a tire using this type of the mold is ordinarily performed by pressing a green tire, which has not been applied with a predetermined design and produced by pre-molding polymerized rubber materials and the like, to a mold. This type of the molding is called as compression molding.

In the course of such a compression molding, a number of closed spaces, which are called blockade spaces, are formed between the green tire and the projections and depressions such as ribs, blades, and the like formed on the mold surface, when a green tire is pressed into a mold. During molding, air within the blockades is not discharged therefrom, and thus, air bubbles are contained in the molded tire finally obtained. This is a problem when air bubble defects, such as air inclusions, are produced.

Further, after molding, molds for molding a tire should be ordinarily subjected to inspection and maintenance treatment, including periodic cleanings and the like, since the surface of the mold is roughened due to adherence of oils and fats and the like during repeated use. Depending on the mold, this cleaning and the like can become troublesome, requiring the introduction of long cleaning times and expensive equipment. This results in a problem that production costs of the articles produced increase.

To prevent the formation of the aforementioned air inclusions, methods of removing air from molds are usually implemented to cope with this situation.

As a means for removing air from the closed spaces, there have been conventionally employed two types of means; one of which is called a venthole type means and the other a non-spew or slit vent type means.

The method employing the venthole type means is such a one that air within blockades is discharged therefrom to the outside through air removal apertures called ventholes provided in the mold so as to make them lead to blockades. In the case of this method, the manufacturing costs of the mold are less expensive and this method has an advantage since one may employ, for maintenance and inspection, a simple blast method which comprises blowing media such as glass beads, resin beads, dry ice pellets, and the like to the interior surface of the mold with high-pressure air. However, spew (whisker projections) are formed on the final molded tire (the tire product) since air is discharged accompanying the outflow of raw tire material (a green tire) into ventholes when the venthole type means is used. There is a disadvantage in that the external appearance and initial running performance of the molded tire are deteriorated.

The method employing a non-spew or slit vent type means is such a method that air within blockades is discharged to the outside through gaps formed between sub-molds or slit-like air removal means provided in the predetermined locations; thus this method is superior in the external appearance with respect to a molded tire. Further, there is an advantage in that adverse effects on the initial running performance are not seen. The occurrence of spew can be prevented when a non-spew or slit vent type means is employed, however, it cannot prevent the formation of burred extensions. Further, in the case of this type of a mold, not only is the production cost of a mold expensive, but also there is a disadvantage in that clogging during molding occurs readily in addition to being more expensive. In addition to the above, with regard to maintenance and inspection, the mold should be broken down into every sub-mold if one employs a simple blast method. Thus, it requires several man-hours for cleaning by blasting. Further, since slit portions clog readily with repeated blasting and the contaminants accumulated in slit portions are difficult to remove, special cleaning methods such as chemical cleaning and plasma cleaning should be used. This requires long cleaning times and the introduction of expensive equipment. This is a disadvantage in that the production costs of the molded item increase.

As mentioned above, there are respective advantages and disadvantages in these two type means for air removal. Therefore, at present, one should choose a proper mold taking into consideration the use of tire to be produced, production costs, and the like. That is, at present, a mold equipped with a non-spew type means is used when a serious consideration must be given to the external appearance and the initial performance of a tire, with the acceptance of a relatively expensive production cost. On the other hand, however, a mold equipped with a venthole type means is used when a serious consideration must be given to the production costs of a mold and the running costs in tire molding, with the acceptance of a relatively poor external appearance and relatively poor initial running performance of a tire. Thus, a satisfactory balance between all aspects of the external appearance, the initial performance and the production costs of tire is desired.

In light of these circumstances, various types of measures are being proposed. For example, there is proposed in JP-A-9-141660 a mold equipped with air removal lids provided in ventholes. This air removal lid is provided with a movable lid insert comprising an axis and a lid head disposed thereon. This lid head is provided with a cavity and a surface having a circular-truncated-cone-shape on the opposite side of the cavity, and being mostly flat on the side near to the cavity. Further, this air removal lid is provided with a casing and is press fitted into the venthole together with this casing.

An air removal lid thus configured has the functions mentioned below. Namely, the lid insert is always pressed to upper side by means of a spring loaded with force. Moreover, the lid insert is, during compression molding using a green tire, pressed down in opposition to the loaded force of a spring by means of pressing a level surface of the lid head into a green tire. During this downward pressing, air can be removed through gaps, that is, air passages, formed between the casing and lid insert. Further, infiltration into air passages of the green tire can be prevented by interrupting air passages with such contact of the casing and the circular-truncated-cone-shaped surface when compression molding is completed. Furthermore, the lid insert is pushed upwardly again by means of a loaded spring in the cavity during removal of the vulcanized tire from the mold after vulcanization is completed.

Nonetheless, a mold provided with the air removal lid suffers, as mentioned later, from clogging in a relatively high frequency due to constraints of that structure. The "leakage distance," which is an index for judging the easiness in clogging, is defined as "Area in the Opening and Closing Surface of an Air Removal Lid," and also as the contact area between the casing and the circular-truncated-cone-shaped surface in the case of the device disclosed in JP-A-9-141660, or, in other words, the "distance from the peripheral portion of the lid opening and closing surface to the holes for air removal" and the distance from the peripheral portion of the casing to the entrance of air passages in the case of the device disclosed in JP-A-9-141660 cannot be set to be long. In this event, rubber burrs are readily reachable up to the air removal holes, i.e., air passages during tire molding. As a consequence, there is such a problem that they infiltrate into air removal holes and cause clogging. Namely, the constraints are present as a result of the structure since the air removal lid must be embedded inside a tubular casing and stored. To avoid interference in designing, one cannot employ a casing having an external diameter in terms of radius of approximately 3 mm or more. In this event, the internal diameter of the casing should be shortened to have a long leakage distance. The radius, however, must be approximately 1.6 mm even at a minimum since the air removal lid is housed in the venthole. Therefore, since there exists the boundary in having a long this leakage distance, clogging occurs readily from rubber burr infiltration into air removal holes (air passages). Thus, this brings a problem that the increase in the maintenance expenses (running cost) cannot be eliminated. Moreover, in the case that rubber burrs which have been temporarily infiltrated into the internal area of the air removal holes (air passages) are cut off at the time of demolding the tire from the mold, this would result in a further rise in the probability of the occurrence of clogging. This is because a portion corresponding to the leakage distance is housed in the internal portion of the air removal holes (air passages). Further, there is a problem in that production costs increase due to the numerous parts and complicated structures.

SUMMARY OF THE INVENTION

It is an object of the present invention, in light of the above problems, to provide a mold for molding a tire so that when molding a tire, the occurrence of spew (whisker projections) and burred extensions on a tire surface is prevented and the tire obtained can have good initial performance and external appearance, at the same time, reducing the number of the sub-molds in the mold and their production costs and effectively preventing clogging derived from rubber burr infiltration in ventholes and for allowing design to reduce running costs by simplifying maintenance and inspection work.

Accordingly, there is provided a mold for tire molding described below in detail.

According to one aspect of the present invention, there is provided a mold for molding a tire, comprising: at least two sub-molds being capable of forming a predetermined form as a whole when used for molding a tire, characterized in that the mold is equipped with the at least two sub-molds, each of which has a plurality of air removal apertures for discharging air from blockades formed between a green tire and sub-molds when the green tire is pressed on respective surfaces of the sub-molds during tire molding, and a plurality of ventlids, each of which has a lid mechanism. The lid mechanism is made of a flexible, and chemically inactive material without fusing with the green tire, and being capable of using repeatedly at a temperature of 100–200° C., discharging air from blockades with keeping an open state by spring up until the green tire contacts an upper portion of the mold when the green tire is pressed on respective surfaces of the sub-molds during tire molding, continuing to discharge air while reducing degree of its spring up during a period from a time when the green tire contacts the upper portion to a time when it reaches the surface of the sub-molds, and preventing the green tire from flowing out of the ventlids by forming a closed state where the ventlids are intimately contact with the green tire by dissolving its springing up when the green tire reaches the surfaces of the sub-molds.

According to a second aspect of the present invention, there is provided a mold for molding a tire according to the first aspect, wherein the ventlid is a flexible plate member and the lid mechanism of the ventlid passes through the direction of the thickness of the ventlid; the ventlid being formed by bending upwardly at a predetermined angle a cut portion cut along with a baseline formed by a straight line linking a starting point and an end point both of which are a starting point(s) and an end point(s) of one or more straight or curved cuts, and do not coincide each other.

According to a third aspect of the present invention, any one of the molds of the first and second aspects is provided, wherein the lid mechanism formed inside the venthole or formed as a venthole itself is provided with means of positioning to prevent further pressing downwards when there is formed a closed state where the ventlids are in intimate contact with the green tire by dissolving its springing up at a time when the green time reaches the surfaces of the sub-molds.

Fourthly, there is provided a mold according to the third aspect of the present invention, wherein the means of positioning is a positioning pin disposed in a standing form in direction of the central axis of the venthole so as to make an upper portion thereof contact intimately with the lid mechanism in a closed state by means of a support member provided in the venthole.

Fifthly, there is provided a mold according to the third or fourth aspect of the present invention, wherein the means of positioning is a positioning structure where the diameter of the venthole is set to be small so as to make the leading edge of the lid mechanism contact with the upper portion of the peripheral wall of the venthole when the lid mechanism is in a closed state.

According to a sixth aspect of the present invention, there is provided a mold according to the first aspect of the present invention, wherein the ventlid is a flexible plate member, and is formed by bending at a predetermined angle cut portions which are a cut along with a baseline formed one or more continuous or non-continuous straight or curved lines.

Seventhly, there is provided a mold according to the sixth aspect of the present invention, wherein the ventlid is fixed in a vent tube at a weld site by using as a boundary the cuts formed by passing through the direction of the thickness, and the vent tube where the ventlid is fixed is provided in the venthole.

Eighthly, there is provided a mold according to the sixth aspect of the present invention, wherein the ventlid is directly fixed in a predetermined location of the sub-molds a weld site by using as a boundary the cuts formed by passing through the direction of the thickness.

According to a ninth aspect of the present invention, there is provided a mold according to the first aspect of the present invention, wherein the ventlid is a lens-shaped flexible plate member where two circles or ellipses lay in a line and the lid mechanism of the ventlid is formed by bending at a predetermined angle with a baseline of a joint portion where the two aforementioned circles lay in a line.

Tenthly, there is provided a mold according to the ninth aspect of the present invention, wherein the ventlid is fixed in a vent tube at a predetermined location of one plate member of the plate members that are bent; the vent tube where the ventlid is fixed being provided in the venthole.

Eleventhly, there is provided a mold according to the ninth aspect of the present invention, wherein the ventlid is directly fixed by fixing one plate member among the bent plate members at its predetermined location to a predetermined location of the sub-molds.

According to a twelfth aspect of the present invention, there is provided a mold according to the first aspect of the present invention, wherein the ventlid is a keyhole-shaped flexible plate member where a circle, ellipse, or shell-shape and a rectangular shape lay in a line and the lid mechanism of the ventlid is formed by bending the flexible plate at a predetermined angle by using a baseline a line formed by the circle, ellipse, or shell-shape and a rectangular shape or a straight line positioned at the proximity of the aforementioned line.

Thirteenthly, there is provided a mold according to the twelfth aspect of the present invention, wherein the ventlid is fixed by embedding directly the rectangular plate member among the bent plate members into a predetermined location of the sub-molds to fix.

Fourteenthly, there is provided a mold according to the twelfth aspect of the present invention, wherein the ventlid is fixed by fixing the rectangular plate member among the bent plate members at its predetermined location to sipe blades disposed in predetermined locations of the sub-molds.

According to a fifteenth aspect of the present invention, there is provided a mold according to the first aspect of the present invention, wherein the ventlid is made of a flexible plate member whose shape is composed of a shape corresponding to design of a shape of the periphery of a tire and a rectangular shape in series, and the lid mechanism of the ventlid is formed by bending the flexible plate at a predetermined angle using as a baseline a portion where the design of the shape of the periphery of a tire and a rectangular shape lay in a line.

According to a sixteenth aspect of the present invention, there is provided a mold according to the fifteenth aspect of the present invention, wherein the ventlid is fixed to a vent tube at a predetermined location of the rectangular plate member among the bent plate members, and the vent tube to which the ventlid is fixed is housed in the venthole.

According to a seventeenth aspect of the present invention, there is provided a mold according to the fifteenth aspect of the present invention, wherein the ventlid is a ventlid in which a predetermined location of the rectangular plate member among the bent plate members is directly fixed in a predetermined location of the sub-molds.

According to an eighteenth aspect of the present invention, there is provided a mold according to any one of the sixth through sixteenth aspects of the present invention, wherein a plate member capable of opening and closing among the bent plate members is made of a plate member having a surface shape corresponding to the surface shape of the sub-molds.

According to a nineteenth aspect of the present invention, there is provided a mold according to the eighteenth aspect of the present invention, wherein a plate member capable of opening and closing among the bent plate members is a plate member to which a shaped component having a surface shape corresponding to the surface shape of the sub-molds is fixed.

Twentiethly, there is provided a mold according to any of the other nineteen aspects of the present invention, wherein the ventlid is made of a silicone elastomer or a fluorocarbon elastomer.

BRIEF DESCRIPTION OF THE DRAWINGS

FIGS. 1(*a*) and 1(*b*) show an explanatory drawing to schematically indicate one of the preferred embodiments of the mold for molding a tire in the present invention, where (*a*) is a top view and (*b*) is a cross-sectional view at line A—A.

FIGS. 7(*a*) to 7(*d*) show a cross-sectional view to schematically indicate a means of positioning in the event of use of the first ventlid used in one of preferred embodiments of the mold for molding a tire in the present invention indicating respective stages where (a) is the stage in which the lid is in an open state, (b) is a cross-sectional view at line A—A, (c) is the stage of the movement state where the lid is pushed downwards, and (d) is that stage in which the lid is in a closed state.

FIGS. 9(a) to 9(e) show a cross-sectional view to schematically indicate the order of processes (a) to (e) for methods of manufacturing the first ventlid used in one of preferred embodiments of the mold for molding a tire in the present invention.

FIGS. 11(a) to 11(h) show a cross-sectional view to schematically indicate the order of processes (a) to (h) for an example of methods of manufacturing a mold for molding a tire in the present invention in the event of use of the first ventlid.

FIGS. 12(a) to 12(d) show a cross-sectional view to schematically indicate the order of processes (a) to (d) for another example of methods of manufacturing a mold for molding a tire in the present invention in the event of use of the first ventlid.

FIG. 13 shows an explanatory drawing to schematically indicate still another embodiment of the mold for molding a tire in the present invention.

FIGS. 14(a) to 14(e) show a cross-sectional view to indicate a specific example of methods to fix to a vent tube the second ventlid used in still another embodiment of the mold for molding a tire in the present invention.

FIGS. 15(a) to 15(g) show a cross-sectional view to indicate a specific example of methods to fix to a sub-mold the second ventlid used in still another embodiment of the mold for molding a tire in the present invention.

FIG. 17 shows an explanatory drawing to schematically indicate the third ventlid used in still another embodiment of the mold for molding a tire in the present invention.

FIGS. 18(a) to 18(f) show an explanatory drawing and a cross-sectional view to indicate a specific example of methods to fix to a vent tube the third ventlid used in still another embodiment of the mold for molding a tire in the present invention.

FIGS. 19(a) and 19(b) show an explanatory drawing and a cross-sectional view to indicate a specific example of methods to fix to a sub-mold the third ventlid used in still another embodiment of the mold for molding a tire in the present invention.

FIGS. 20(a) to 20(e) show an explanatory drawing and a cross-sectional view to indicate other specific examples of methods to fix to a sub-mold the third ventlid used in still another embodiment of the mold for molding a tire in the present invention, with a partially enlarged drawing FIG. 20(e) of the part 2c shown in FIG. 20(d).

FIGS. 23(a) to 23(j) show an explanatory drawing and a cross-sectional view to indicate a specific example of methods to fix to a sub-mold the fourth ventlid used in still another embodiment of the mold for molding a tire in the present invention, with a partially enlarged drawing FIG. 23(j) of the part 2d shown in FIG. 23(i).

FIGS. 24(a) to 24(h) show an explanatory drawing and a cross-sectional view to indicate other specific examples of methods to fix to a sub-mold the fourth ventlid used in still other embodiment of the mold for molding a tire in the present invention, with a partially enlarged drawing FIG. 24(i) of the part 2d shown in FIG. 24(h).

FIGS. 25(a) to 25(c) show a cross-sectional view to schematically indicate a lid mechanism during compression molding of the fourth ventlid used in one of preferred embodiments of the mold for molding a tire in the present invention.

FIGS. 26(a) to 26(e) show a cross-sectional view to indicate other specific examples of methods to fix to a vent tube the fourth ventlid used in still another embodiment of the mold for molding a tire in the present invention.

FIGS. 29(a) and 29(b) show an explanatory drawing to schematically indicate comparison of the fourth ventlid in a state of fixture to a sub-mold and the sixth ventlid in a state of fixture to a sub-mold used in still another embodiment of the mold for molding a tire in the present invention.

FIG. 30 shows an explanatory drawing to schematically indicate the sixth ventlid used in one of preferred embodiments of the mold for molding a tire in the present invention.

FIG. 31 shows an explanatory drawing to schematically indicate a state of fixture to a sub-mold for the seventh ventlid used in still another embodiment of the mold for molding a tire in the present invention.

FIG. 32 shows an explanatory drawing to schematically indicate an example of manufacturing the seventh ventlid used in still another embodiment of the mold for molding a tire in the present invention.

FIGS. 33(a) and 33(b) show an explanatory drawing to schematically indicate strengthening of the lid portion of the ventlid when using the sixth ventlid.

FIGS. 34(a) to 34(f) show a cross-sectional view to schematically indicate a method of providing on a sub-mold the first ventlid in an embodiment of the mold for molding a tire in the present invention, where (a) is the sub-mold used, (b) is the ventlid used, (c) is the backing member used, and (d) to (f) are respective states of installation (insertion).

FIGS. 35(a) to 35(c) show an explanatory drawing to schematically indicate the structural elements used in an embodiment of the mold for molding a tire in the present invention, where (a) is the sub-mold, (b) is the first ventlid, and (c) is the positioning tube.

DETAILED DESCRIPTION OF THE INVENTION

The preferred embodiments of the present invention will hereinafter be described in detail with reference to the drawings.

As indicated in FIG. 1(a), a mold for molding a tire 10 in the present invention is divided into 2 or more sub-molds 10a and is used as a complete mold in the mode indicated in FIG. 1(a) when these sub-molds 10a are combined as a whole during tire forming. FIG. 1(b) is a cross-sectional view at line A—A. In FIGS. 1(a) and 1(b), the mold is divided into 7 pieces along the circumference wherein segmented molds are employed for dividing a mold, but 2-piece molds are employed in a similar manner.

In addition, as examples of materials to form molds for tire molding of the present invention, aluminum alloy and iron alloy may be mentioned. Of these, aluminum alloys for casting (AC4C and the like) and cast iron (FCD600 and the like) are preferable due to the extreme precision of casting and soundness of the metallic structure.

Figure 2A:
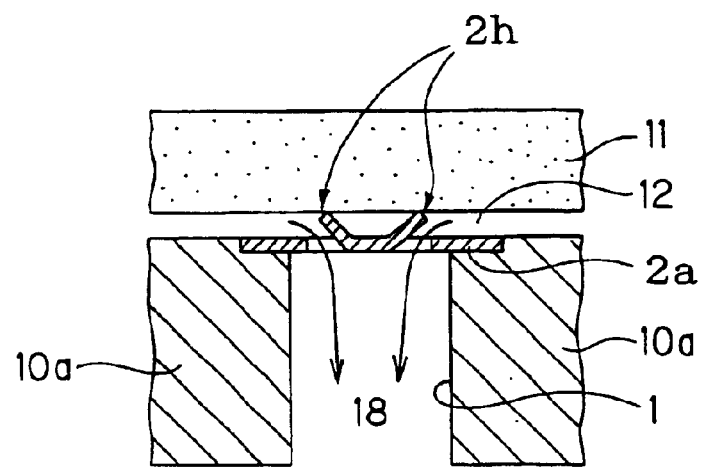
FIGS. 2(*a*) to 2(*c*) show an explanatory drawing to schematically indicate a lid mechanism during compression molding with the first ventlid used in one of the preferred embodiments of the mold for molding a tire in the present invention respectively indicating (*a*) an open state, (*b*) a transitional state for transition from an open state to a closed state (a state where the degree of separation after rising is reduced), and (*c*) a closed state.
Figure 2B:
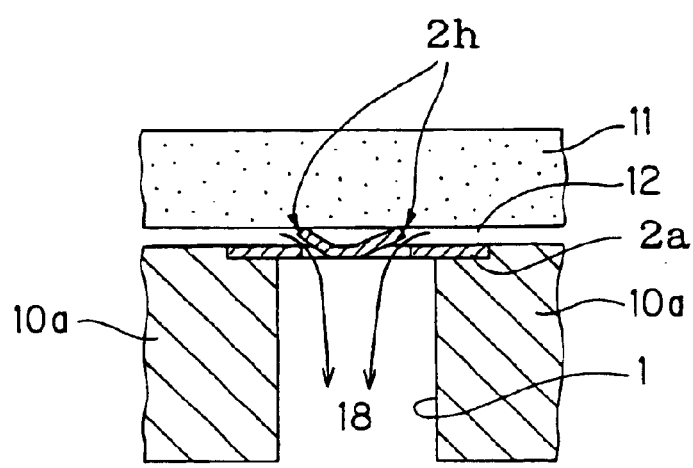
Figure 2C:
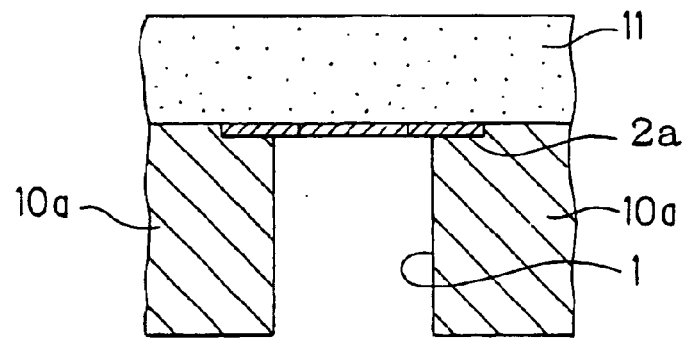
Figure 3A:
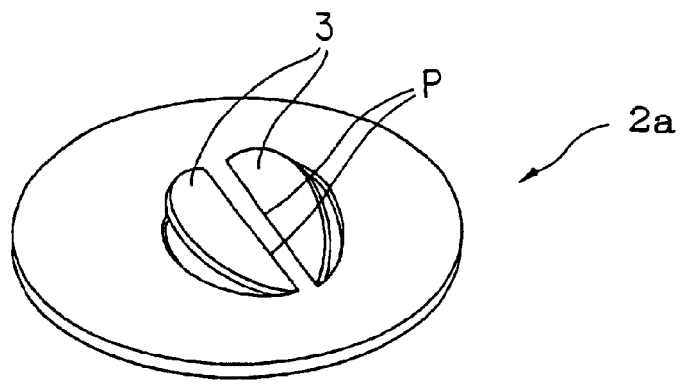
FIGS. 3(*a*) to 3(*d*) show an explanatory drawing to schematically indicate the first ventlid used in one of preferred embodiments of the mold for molding a tire in the present invention.
Figure 3B:
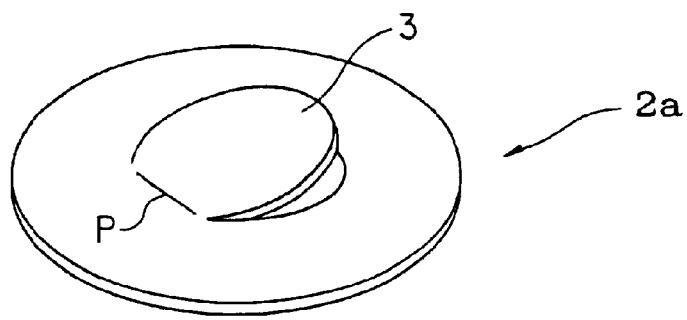
Figure 3C:
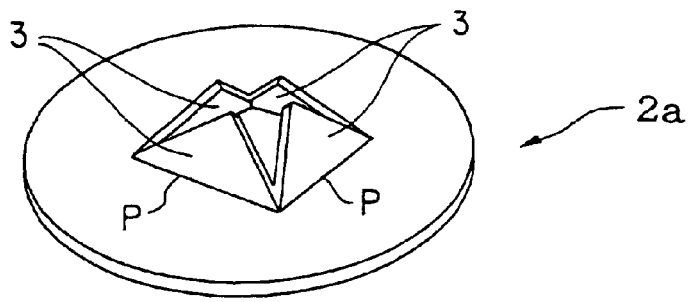
Figure 3D:
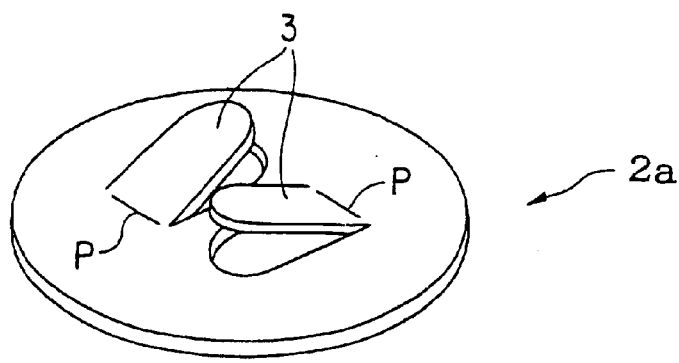

As indicating in FIGS. 2(a) to 2(c), a mold for molding a tire according to the present invention is provided, including at least two sub-molds 10a being capable of forming a predetermined form as a whole when used for molding a tire, characterized in that the mold is equipped with the at least two sub-molds each of which has a plural number of air removal apertures 1 for discharging air from blockades 12 formed between the green tire 11 and sub-molds 10a when a green tire is pressed on respective surfaces of the sub-molds during tire molding, and a plurality of ventlids (ventlids 2a are a first ventlid in case of the mold shown in FIG. 2). Each of the ventlids 2a has at least one lid mechanism, the lid mechanism being made of a flexible, and chemically inactive material without fusing with the green tire, and being capable of using repeatedly at a temperature of 100–200° C., discharging air 18 from blockades 12 with keeping the lid mechanism an open state by spring up until the green tire contacts an upper portion 2h of the mold when the green tire is pressed on respective surfaces of the sub-molds 10a during tire molding (See FIG. 2(a)). Air 18 is continued to be discharged while reducing degree of its spring up during a period from a time when the green tire 11 contacts the upper portion 2h of the lid mechanism to a time when it reaches the surface of the sub-molds 10a (See FIG. 2(b)). The green tire 11 is prevented from flowing out of the mold by forming a closed state where the ventlids 2a intimately contact the green tire 11 by dissolving its springing up when the green tire reaches the surfaces of the sub-molds 10a (See FIG. 2(c)). Indeed, it may be possible to dispose a plural number of lid mechanisms per ventlid as far as such a disposition does not disturb the function of the mold as a whole.

When, for a venthole 1, a positioning structure as mentioned later is not considered, there is no particular limitation on the size and the like as long as it allows ready discharge of the air 18 from the blockades 12 to the outside, though, as an example, a diameter of 0.6–2.0 mm is preferable. In addition, the diameter when a positioning structure is considered as mentioned later must be smaller than a desired size of the lid or the ventlid.

It is preferable to use, as a ventlid 2a, a flexible plate member for reduction in the production cost of the mold itself and for simplification of maintenance and inspection work.

Further, it is preferable that this ventlid is made of a flexible, chemically inactive and not fusing with the green tire such as, for example, natural rubber, synthetic rubber with butadiene polymers (BR), butadiene styrene polymers (SBR), and the like, or any composites of these, and allowing repeated use at temperatures of 100 to 200° C. Specifically, silicone elastomers, fluorocarbon elastomers, acrylic elastomers or fluorosilicone elastomers, and metals like stainless steel and titanium alloys may be mentioned as a suitable example. Of these, elastomers are preferable, and silicone elastomers of fluorocarbon elastomers are more preferable.

The elastomer ventlid can be produced, for example, by means of cast molding or thermosetting molding by using a mold. Therefore, even in the case that the surfaces of sub-molds have a complicated design shape such as, for example, on which a marking line or the convex shape of a saw blade is present, the ventlid may be produced in a relatively simple and inexpensive manner by cast molding or thermosetting molding. Thus, a reduction in the production cost of the mold itself may be attained, and an air removal mechanism may be disposed in the ventlid installation region as well without harming the mold surface shape. Further, the elastomer ventlid according to the present invention can open and close a lid mechanism by means of rotary motion around a standard baseline as a basis as mentioned later. Thus, in contrast to lid opening and closing which is performed by means of the reciprocating motion of the lid insert in the air removal lid as is disclosed in JP-A-9-141660. The structure can be simplified and the occurrence of clogging can be effectively prevented.

There are no limitations on the ventlid 2 having a lid mechanism or a flap mechanism (hereinafter referred to as a lid mechanism) according to the present invention, as long as it readily discharges air 18 from the blockades 12 during tire molding and does not cause the green tire 11 to outflow and clogging does not occur, however, specifically the first to seventh ventlids listed below may be mentioned.

First ventlid

As indicated in FIGS. 3(a) to 3(d), the first ventlid 2a has a lid 3 of a structure formed by bending upwardly at a predetermined angle as a baseline P formed by a straight line linking the starting point and an end point of one or more straight or curved cuts which pass through the direction of the thickness, and the starting point and an end point do not coincide each other.

Figure 4A:
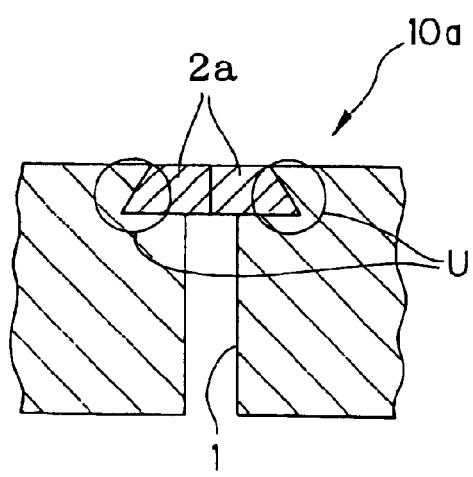
FIGS. 4(*a*) and 4(*b*) show a cross-sectional view to indicate a specific example of methods to fix to a sub-mold the first ventlid used in preferred embodiment of the mold for molding a tire in the present invention, where (*a*) and (*b*) indicate respective methods of fixture along an undercut.
Figure 4B:
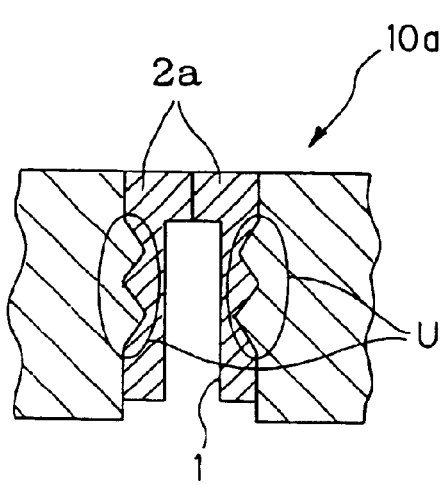

Further, in the case that the first ventlid 2a is made of an elastomer, an assembly and fixture to the sub-molds can be simplified since a simple insertion system may be employed. Namely, a simple fixture can be done by means of pressing (inserting) a ventlid 2a formed into a shape identical with an undercut shape U produced by cast removal or machining in the surface of the sub-mold 10a as shown in FIGS. 4(a) and 4(b). Accordingly, any special means of adhesion is not required and thus, the replacement work of the ventlid may be simplified. Reduction of the production cost of the mold itself can be attained, too.

Further, measures with respect to maintenance and inspection for mold, cleaning and the like can be simplified for the first ventlid 2a. Namely, portions of oils and fats and the like accumulated in the openings of a lid can be easily removed through use of the sandblasting method with the first ventlid 2a. Further, it has the advantage in that it is highly resistant to chemical agents used in chemical cleaning in contrast to one made of metal. The same thing is applicable to other ventlids according to the present invention as far as this advantage is concerned.

Figure 5A:
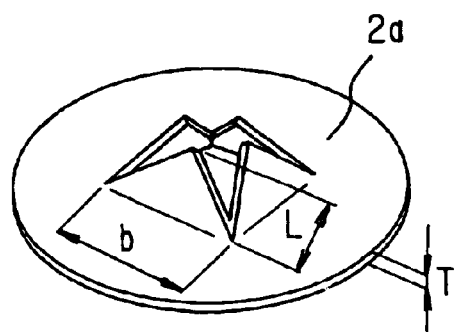
FIGS. 5(*a*) to 5(*c*) show an oblique view to schematically indicate the dimensional relationship with design of the first ventlid used in the present invention.
Figure 5B:
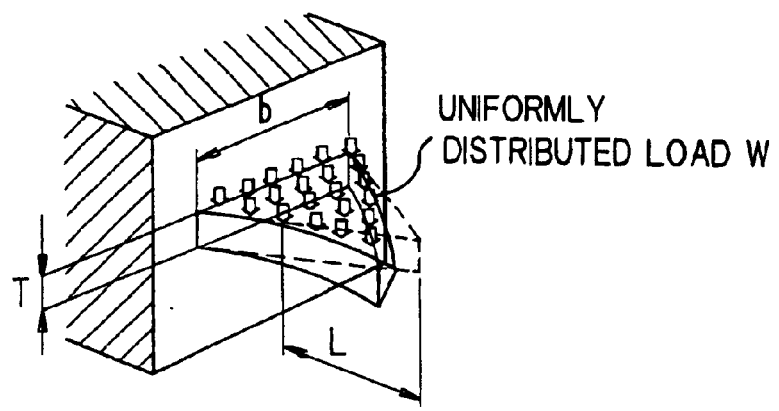
Figure 5C:
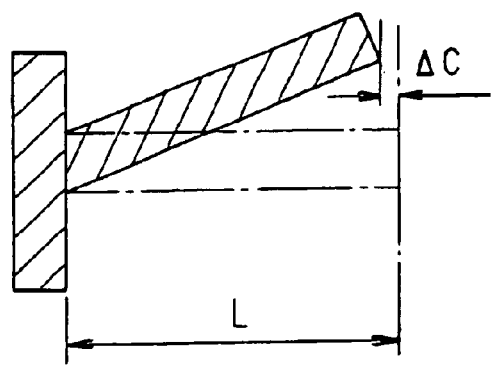

Examples of designs of the first ventlid 2a are, for example, as shown in FIGS. 5(a) to 5(c). The degree of opening (ΔC) of the lid opening when internal pressure W (generally tire molding pressure of 10–20 kgf/cm$^2$) in the blockade in the mold is applied as a uniformly distributed load when using ventlid 2a (material: silicone elastomer, thickness T: 0.06–0.1 cm, lid length L: 0.05–0.07 cm, length b of baseline P: 0.10–0.15 cm, Young's modulus E: 30–50 kgf/cm$^2$) during tire molding can be regulated to 0.3/1000–0.7/1000 cm, as is derived from material strength calculations and the description in the Japanese Laid Open Patent Publication No. JP-A-2002-113719, filed on Oct. 10, 2000 by the applicant of the present invention.

A design in this manner by means of its structure prevents the occurrence of spew (whisker projections) and burred extensions on a tire surface during tire molding, with allowing good initial performance and external appearance of the tire obtained.

Figure 6A:
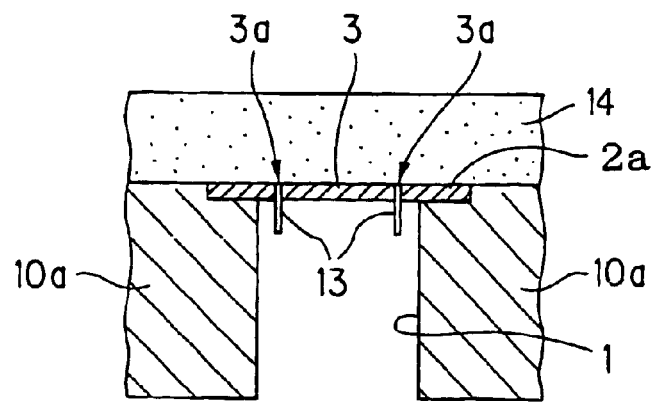
FIGS. 6(*a*) to 6(*c*) show a cross-sectional view to schematically indicate the production of rubber burrs after tire molding in the event of use of the first ventlid used in one of preferred embodiments of the mold for molding a tire in the present invention, where (*a*) is the state where rubber burrs are produced and (*b*) to (*c*) are respective states for ready removal of rubber burrs produced with the lid automatically rising after separation.
Figure 6B:
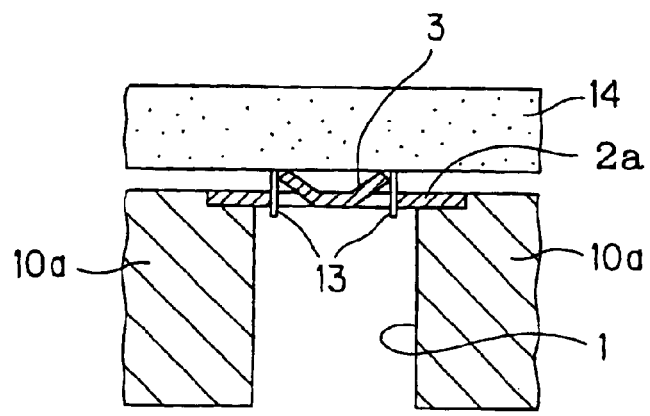
Figure 6C:
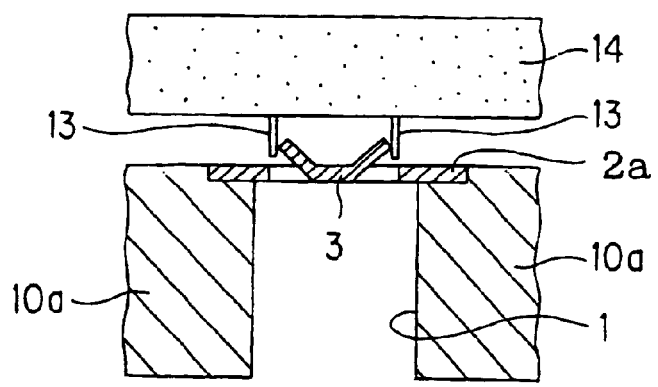

Further, as shown in FIGS. 6(a) to 6(c), the lid 3 automatically springs up, rubber burrs 13 formed would be easily pulled out from the mold (FIGS. 6(b) to 6(c)) after separation in accordance with separation of the molded tire 14 from the sub-molds 10a even when several rubber burrs (outflow of green tire) 13 are produced, as is shown in FIG. 6(a). In this event, rubber burrs 13 are cut off during separation (removal from a mold) of the molded tire 14 from the sub-mold 10a and in turn the clogging occurrence due to rubber burrs 13 in the venthole 1 could be prevented even if rubber burrs 13 are produced. Furthermore, measures with respect to maintenance such as mold cleaning and the like, and inspection can be simplified.

As mentioned, a completely closed state at the point where the green tire contacts the sub-mold surface and molding internal pressure has fully acted for the lid mechanism in the first ventlid 2a is preferable. In this event, however, conditions for the mechanical strength characteristics of the ventlid material and tire molding pressure are ascertained, and determination of the lid shape, ventlid thickness, and the like must be made after carrying out strength of material calculations. Man-hours for the ventlid design will unfortunately increase. Further, there are also instances where specially calculated design values are not reproduced due to variations in molding conditions. There are also difficulties in restraining so-called "sagging" where the ventlid is pushed further downwards from a closed state and the green tire outflows to produce burrs. Accordingly, positioning as a means of preventing this malfunction to prevent the lid mechanism from being pushed further downward is preferable.

A positioning pin 24 provided in the direction of the central axis of a venthole 21, for example, where, as shown in FIGS. 7(a) to 7(d), an upper portion of a support member 23 provided in a venthole 21 presses on a green tire 25 and by such contact with a lid mechanism 22 produces a closed state may be mentioned as a suitable example of this means of positioning.

Figure 8A:
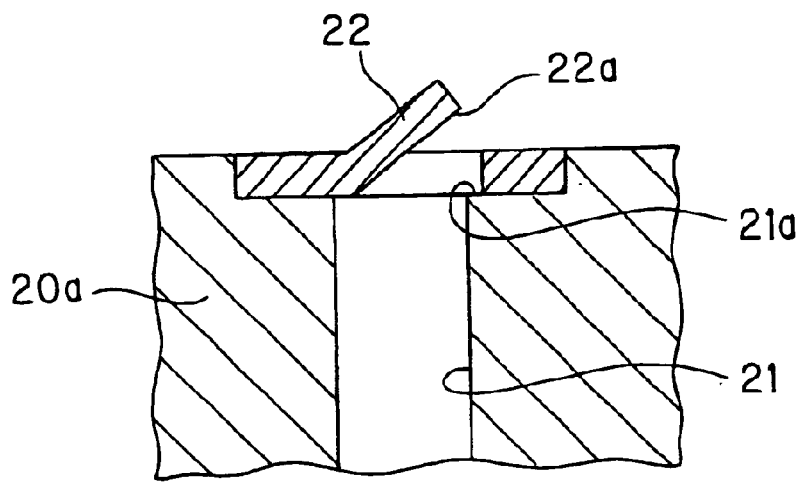
FIGS. 8(a) to 8(c) show a cross-sectional view to schematically indicate other means of positioning in the event of use of the first ventlid used in one of preferred embodiments of the mold for molding a tire in the present invention indicating respective stages where (a) is the stage in which the lid is in an open state, (b) is the stage of the movement state where the lid is pushed downwards, and (c) is that stage in which the lid is in a closed state.
Figure 8B:
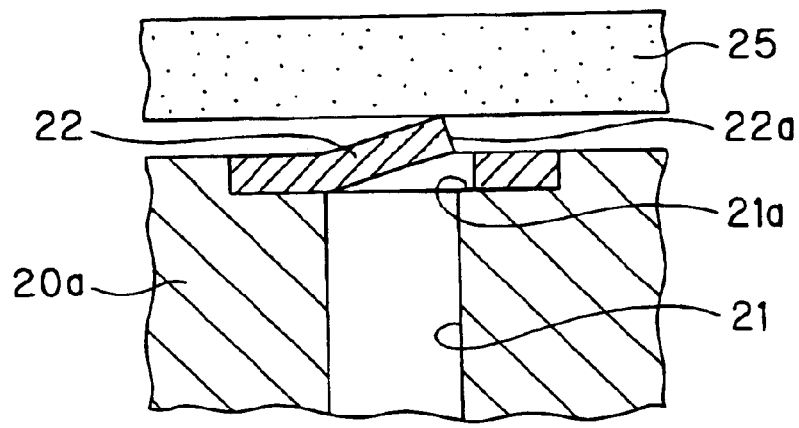
Figure 8C:
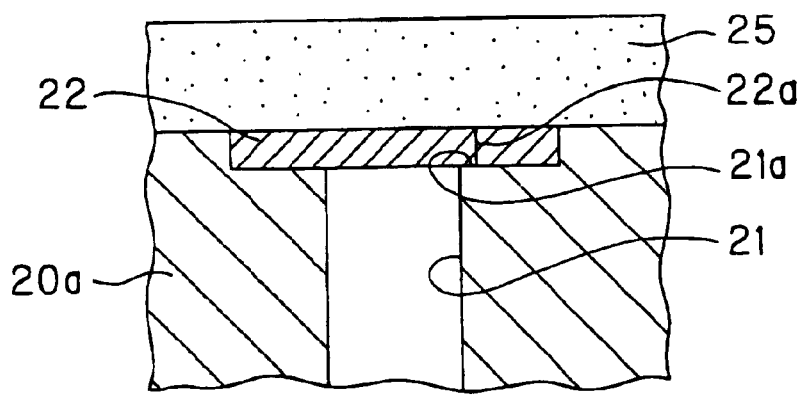

Further, there may be mentioned, as another means of positioning, a positioning structure as shown in FIGS. 8(a) to 8(c) in which the diameter of a venthole 21 has been set smaller so as to make the leading edge 22a of the lid mechanism 22 intimately contact with the upper portion of the peripheral wall 21a of a venthole 21 in the sub-mold 20a when the lid mechanism has produced a closed state.

By means of providing the means of positioning, a so-called "overshoot phenomenon," where the lid 22 is pushed excessively (from a closed state as well) downwards during tire molding, can be prevented. Thus, the ventlid can be fashioned in thinner form in order to make the lid flexible with respect to the opening and closing characteristics (spring characteristics) thereof. Further, a thinner thickness for the ventlid can be designed without considering outflow of the green tire when one made of an elastomer is used.

The first ventlid 2a can be manufactured by the methods as shown in FIGS. 9(a) to 9(e), for example, when it is made of metal. Namely, a top part 15 and bottom part 16 of a mold for ventlid manufacture are prepared (FIG. 9(a)). Ventlid materials 17 are put in place between these parts (FIG. 9(b)). Ventlid materials 17 are held between the top part 15 and the bottom part 16 such that the top part 15 is pulled down, only the clearance 3a of the lid 3 is punched and bent (FIG. 9(c)), the top part is pulled up (FIG. 9(d)), and then the first ventlid 2a is collected (FIG. 9(e)).

In the event the first ventlid 2a is made of an elastomer, it is manufactured by casting it in a mold to obtain a required shape, and it can be manufactured by means of heat-press molding (the first ventlid 2a can also be assembled from multiple pieces as necessary).

There is no particular limitation on the methods of manufacturing a mold for molding a tire according to the present invention using the first ventlid 2a, and widely used methods may be employed. One example is explained below.

Figure 10:
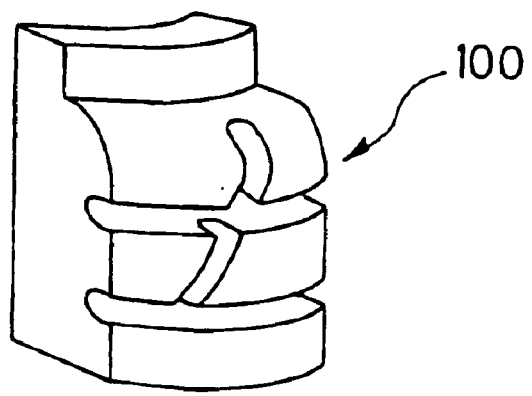
FIG. 10 shows an oblique view to schematically indicate a master model used in an example of methods of manufacturing the mold for molding a tire in the present invention.

Shown in FIG. 10 is a master model (original mold) 100 used to manufacture a mold for molding a tire (hereinafter referred to as "mold"). The grooved surface and design on the outer surface of this master model 100 is the same as the grooved surface and design in the tire product (item to be molded). Ordinarily, casts of this master model are reproduced in required numbers for mold manufacture, and these are assembled in a ring shape for use.

Shown in FIGS. 11(a) to 11(h) is a process to manufacture a mold in the event of use of the master model 100. However, the cross-section of the master model 100 in FIGS. 11(a) to 11(h) has been simplified from that in FIG. 10.

A ventlid original mold 112 is provided (FIG. 11(a)) in a predetermined position on the surface of the convex portion 111 of the master model 100 prepared.

For the sake of ease, it is preferable to form a ventlid original mold 112 somewhat larger than the ventlid (FIG. 11(b)), within a range that the ventlid may be embedded thereinto without causing the embedded ventlid shaking.

Next, a rubber mold 114 that is a reverse mold is manufactured using the master model 100 where the ventlid 112 is provided (FIG. 11(c)).

Next, a casting mold 215 that is a reverse mold of the rubber mold 114 is manufactured (FIG. 11(d)). A casting mold 115 is made from a material that does not deform or damage the rubber mold 114 and is formed from a material, for example, a plaster or a ceramic, to facilitate the casting of metals used in molds.

Next, a casting (mold) 116 that is an inverse mold is produced using the casting mold 115 (FIG. 11(f)).

Next, a venthole 118 is formed by machining using a drill and the like so as to pass air from the bottom of concave portion 117 to the external portion of the mold (FIG. 11(f)).

Next, a ventlid 119 is fixed in the concave portion 117 formed by the venthole 118. As mentioned previously, insertion using an undercut, joining with an adhesive agent, or fastening of a thin metal slat from the top of the ventlid is performed for fixture of the elastomer ventlid 119. Methods such as welding or fixing this to the mold body may be used. With a metal ventlid, it can be fixed to the body of the mold via caulking of the concave portion, a shrink fit using thermal expansion and contraction, adhesion via an adhesive agent, or welding.

For the methods of manufacturing a mold, a venthole is formed via machining, but a venthole can also be formed via the method as shown in FIGS. 12(a) to 12(d). Namely, a pin 129 having the same external diameter as that of the venthole 118 formed in a mold 116 in the casting mold 115 produced is fixed in a predetermined position (FIG. 12(a)).

For this pin 129, use of a material that will not damage welding or fuse to fused metals in the event of casting to manufacture the mold 116 is required. For example, use of a pin of steel material in the event of aluminum casting, a pin of steel material with a ceramic coating in the event of iron and steel material casting, or the like is preferable.

Next, pin 129 is formed by casting the pin 129 in a fixed state in a casting mold 115 and integrated in the mold 116 from the casting mold 115 (FIG. 12(b)). Next, the formation of a venthole 118 can, by withdrawal of the pin 129 that is enveloped in casting by the mold 116 from the mold 115 (FIG. 12(c)), be facilitated (see FIG. 12(d)).

Second ventlid

As is shown in FIG. 13, the second ventlid 2b is a flexible plate member, and the lid mechanism of the ventlid is formed by bending at a baseline to predetermined angle cuts 4 which pass through the direction of the thickness of the ventlid and are formed from 1 or more continuous or non-continuous straight or curved lines. In addition, cuts 4 may also be formed by bending a plate along with an imaginary line as a baseline at a predetermined angle without forming cuts 4.

When the second ventlid 2b is provided in the body of a mold, installation in a venthole fixed to a vent tube is preferable. Namely, as is shown in FIGS. 14(a) to 14(e), cuts 4 are formed passing through the direction of the thickness (FIG. 14(a)), bending to a predetermined angle is performed at cuts 4 as a baseline (FIG. 14(b)), and forming of a pipe-fixed piece at a weld site by using as a boundary the cuts 4 with fixture via spot welding or the like using a welding electrode 6 at the edge portion of a vent tube 5 that is a stainless steel pipe is preferable.

In addition, as shown in FIG. 14(a), desired values for spring characteristics in the lid mechanism may be set by means of changing the intervals between cuts 4, and they may also be formed by bending alone without forming cuts 4.

Shown in FIGS. 15(a) to 15(g) is a process of manufacturing a mold (in the event of use of a pipe-fixed piece 7(b) using the second ventlid 2b.

First, a master model 100a is prepared (FIG. 15(a)).

Next, the rubber mold 114 that is a reverse mold of the master model 100a is manufactured (FIG. 15(b)).

Next, a casting mold 115 that is a reverse mold of the rubber mold 114 is manufactured (FIG. 15(c)). The casting mold 115 is a material that does not deform or damage the rubber mold 114 and is formed of material, for example plaster or ceramic, to facilitate the casting of metals used in molds.

Next, the casting (mold) 116 that is an inverse mold is produced from aluminum or iron using a casting mold 115 (FIG. 15(d)).

Next, a venthole 118 is formed by machining using a drill and the like so as to pass air to the external portion of the mold (FIG. 15(e)). In addition, other methods of cast removal besides machining using the drill and the like may be used for formation of the venthole 118.

Next, a pipe-fixed piece 7b is provided in the venthole 118 (see FIGS. 15(f) to 15(g)). In addition, for installation of a pipe-fixed piece 7b in the venthole 118, fixture by, for example, caulking, a shrink fit using thermal expansion and contraction, or adhesion via an adhesive agent may be used.

When the second ventlid 2b is provided in the body of a mold, direct fixture at a predetermined location in a sub-mold at the weld site by using as a boundary cuts 4 formed by passing through the direction of the thickness of the second ventlid 2b may also be used.

Figure 16D:
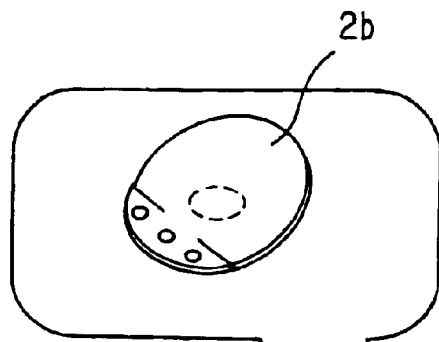
FIGS. 16(a) to 16(d) show a cross-sectional view to indicate other specific examples of methods to fix to a sub-mold the second ventlid used in still another embodiment of the mold for molding a tire in the present invention, with a partially enlarged drawing FIG. 16(d) of the part 2c shown in FIG. 16(c).
Figures 16A, 16C:
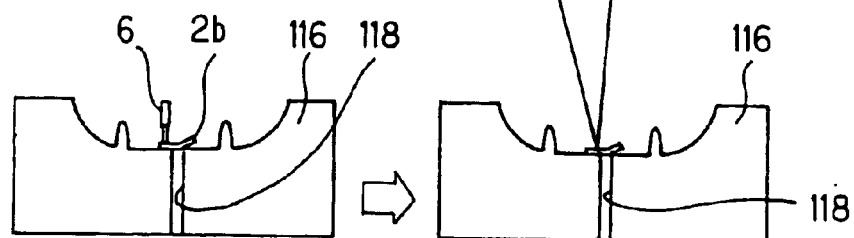
Figure 16B:
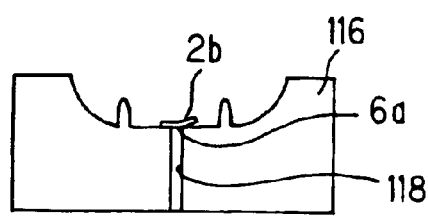

Namely, direct fixture of the second ventlid 2b at a predetermined location in a sub-mold by means of the process as indicated in FIGS. 16(a) to 16(c) after the course of the process in FIGS. 15(a) to 15(e) may also be used. Specifically, the venthole 118 is covered, cuts 4 are formed, and the second ventlid 2b that has been bent to a predetermined angle is put in place. When material for the casting 116 is iron, fixture is by means of spot welding and the like using a welding electrode 6 (FIG. 16(a)). Further, when material for the casting 116 is aluminum, fixture is performed using a heat-resistant adhesive agent (FIG. 16(b)). In this manner, as indicated in FIG. 16(c), the second ventlid 2b can be directly fixed to a predetermined location in the sub-mold. In addition, as shown in FIG. 16(c), there are instances of fixture by means of spot welding and the like using a welding electrode 6 when the material of the casting 116 is iron. As is shown in FIGS. 16(a) to 16(d), counterboring may also be provided in a portion where the second ventlid 2b in provided in a sub-mold when the second ventlid 2b is directly fixed to a sub-mold.

Third ventlid

As is shown in FIG. 17, the third ventlid 2c is a lens-shaped flexible plate member 8 (8a, 8b) where two circles or ellipses lay in a line and the lid mechanism of the ventlid is formed by bending at a predetermined angle at a baseline of a joint portion 8c where two circles or ellipses lay in a line.

When the third ventlid 2c is provided in the body of a mold, installation in a venthole fixed to a vent tube is preferable. Namely, as is shown in FIGS. 18(a) to 18(f), it is preferable to form a pipe-fixed piece (FIG. 18(f)) by bending plate members 8a, 8b at an angle of about 90° at a joint portion where two circles or ellipses lay in a line (FIGS. 18(a) and 18(b)), fixing one plate member 8b at one end of a vent tube 5 by means of spot welding and the like using a welding electrode 6 (FIGS. 18(c) to 18(d)), and bending the other plate member 8a at a predetermined angle (FIG. 18(e)).

In addition, as shown in FIG. 18(a), desired values for spring characteristics in the lid mechanism can be set by means of changing the width q of the joint portion 8c where two circles or ellipses lay in a line.

Shown in FIGS. 19(a) to 19(b) is a process of manufacturing a mold (in the event of use of a pipe-fixed piece 7b) using the third ventlid 2c after the course of the process in FIGS. 15(a) to 15(e).

As is shown in FIGS. 19(a) and 19(b), a pipe-fixed piece 7b is provided in the venthole 118 (FIGS. 15(f) to 15(g)), but in this event, fixture by, for example, caulking, a shrink fit using thermal expansion and contraction, or adhesion via an adhesive agent may be used for installation of a pipe-fixed piece 7b in the venthole 118.

When the third ventlid 2b is provided in the body of a mold, direct fixture of the third ventlid 2c to a predetermined location in a sub-mold at a fixed point of one plate member 8b of the plate members 8 (8a, 8b) that are bent may also be used.

Namely, direct fixture of the third ventlid 2b at a predetermined location in a sub-mold by means of the process as indicated in FIGS. 20(a) to 20(d) after the course of the process in FIGS. 15(a) to 15(e) may also be used. Specifically, the venthole 118 is covered and the third ventlid 2c that has been bent to an angle of about 90° at a joint portion where two circles or ellipses lay in a line is put in place. When material for the casting 116 is iron, fixture is by means of spot welding and the like using a welding electrode 6 (FIG. 20(a)). Further, when material for the casting 116 is aluminum, fixture is performed using a heat-resistant adhesive agent (FIG. 20(b)), and the third ventlid 2c is bent to a predetermined angle (FIG. 20(c)). In this manner, as is shown in FIG. 20(d), the third ventlid 2c can be directly fixed to a predetermined location in the sub-mold. In addition, as is shown in FIG. 20(d), there are instances of fixture by means of spot welding and the like using a welding electrode 6 when the material of the casting 116 is iron. As is shown in FIGS. 20(a) to 20(d), counterboring may also be provided in a portion where the third ventlid 2c in provided in a sub-mold when the third ventlid 2c is directly fixed to a sub-mold.

Fourth ventlid

Figures 21A, 21B:
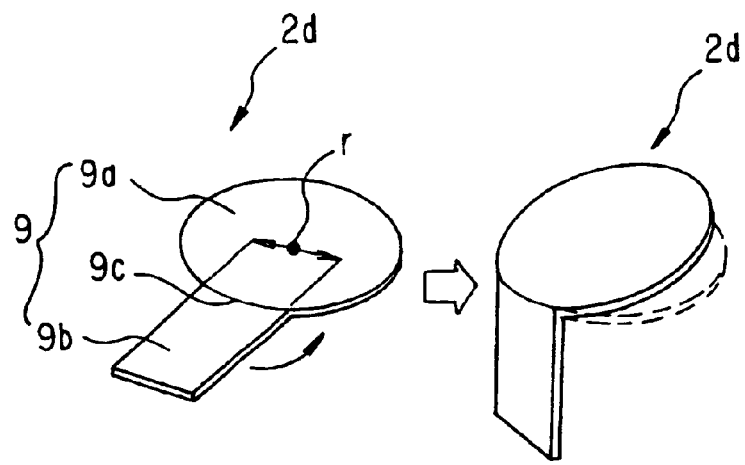
FIGS. 21(a) and 21(b) show an explanatory drawing to schematically indicate the fourth ventlid used in still another embodiment of the mold for molding a tire in the present invention.
Figures 22A, 22B:
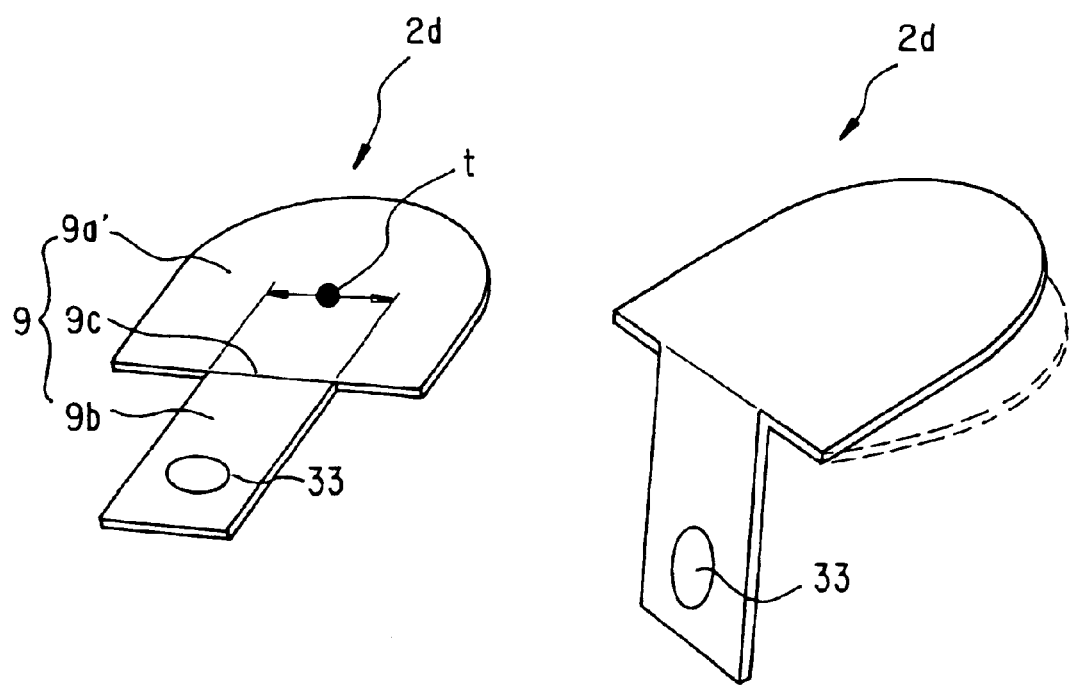
FIGS. 22(a) and 22(b) show an explanatory drawing to schematically indicate an example of the shape of the fourth ventlid used in still another embodiment of the mold for molding a tire in the present invention.
Figures 27A, 27B:
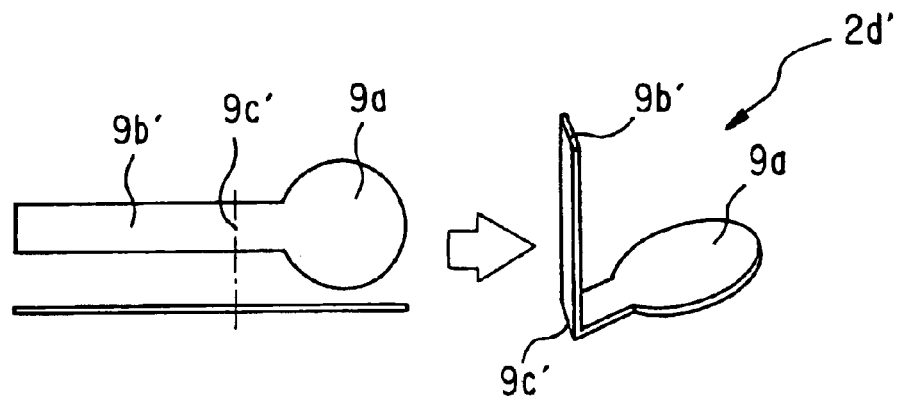
FIGS. 27(a) and 27(b) show an explanatory drawing to schematically indicate the fourth ventlid in the vent of use of methods for "fixture to a sipe blade" used in still another embodiment of the mold for molding a tire in the present invention.

As indicated in FIGS. 21(a) and 21(b), and 22(a) and 22(b), the fourth ventlid 2c is a keyhole-shaped flexible plate member 9 where a circular, elliptical, or shell-shaped plate member and a rectangular plate member lay in a line (namely, a circular, elliptical, or shell-shaped plate member 9a, 9a' and a rectangular plate member 9b) and the lid mechanism of the fourth ventlid 2d is formed by bending at a predetermined angle as a baseline a joint portion 8c where the circular, elliptical, or shell-shaped plate member and the rectangular plate member lay in a line. In addition, shown in FIGS. 21(a) and 21(b) is a configuration of the circular plate member 9a and the rectangular plate member 9b. Shown in FIGS. 22(a) to 22(b) is a configuration of the shell-shaped plate member 9a' and the rectangular plate member 9b and a locking hole provided in the rectangular plate member 9b.

As is shown in FIGS. 21(a) and 22(a), desired values for spring characteristics in the lid mechanism can be set by means of changing the widths r,t of the joint portion 9c where the circular, elliptical, or shell-shaped plate member and the rectangular plate member lay in a line.

When the fourth ventlid 2d is provided in the body of a mold, methods to fix to a predetermined location and installation the fourth ventlid 2d on a sub-mold are, for example, a method via "piece caulking," a method via "piece envelopment casting" and a method via "fixture to sipe blades."

Shown in FIGS. 23(a) to 23(i) is a process of manufacturing a mold using the fourth ventlid 2d in the event of use of a method via "piece caulking." In addition, shown in FIGS. 23 is use of a ventlid 2d produced from a keyhole-shaped plate member 9a where a circle and rectangle lay in a line.

A thin slat for a master model 30 is provided (FIG. 23(a)) in a predetermined position in the master model 100 prepared.

Next, the rubber mold 114 that is a reverse mold is manufactured (FIG. 23(b)) using the master model 100 where the thin slat for a master model 30 is provided.

Next, a thin slat for cast removal 31 is provided in the rubber mold 114 (FIG. 23(c)).

Next, the casting mold 215 that is a reverse mold of the rubber mold 114 where a thin slat for cast removal 31 is provided is manufactured (FIG. 23(d)). The casting mold 115 is a material that does not deform or damage the rubber mold 114 and is formed of material, for example, plaster or ceramic, to facilitate the casting of metals used in molds.

Next, a casting (mold) 116 that is a reverse mold is produced from aluminum or iron using a casting mold 115 (FIG. 23(e)).

Next, the thin slat for cast removal 31 is removed from the cast (mold) (FIG. 23(f)).

Next, the venthole 118 is formed by machining using a drill and the like so as to pass air to the external portion of the mold (FIG. 23(g)). In addition, other methods of cast removal besides machining using the drill and the like may be used for formation of the venthole 118.

Next, the rectangular plate member 9b configured as a fourth ventlid 2d is inserted, embedded, and caulked in an installation hole for a piece 32 after removal of the thin slat for cast removal 31 (FIG. 23(h)). In this manner, as indicated in FIG. 23(i), the fourth ventlid 2d can be directly fixed to a predetermined location in the sub-mold.

Shown in FIGS. 24(a) to 24(i) is a process to manufacture a mold using the fourth ventlid 2d in the event of use of a method via "piece envelopment casting." In addition, shown in FIGS. 24(a) to 24(i) is use of a ventlid 2d produced from the keyhole-shaped plate member 9a', 9b where a shell-shape and rectangle lay in a line.

A thin slat for a master model 30 is provided (FIG. 24(a)) in a predetermined position in the master model 100 prepared.

Next, the rubber mold 114 that is a reverse mold is manufactured (FIG. 24(b)) using the master model 100 where the thin slat for a master model 30 is provided.

Next, the fourth ventlid 2d before bending is provided so as to be embedded on the side with the shell-shaped plate member 9a' in a hole 34 corresponding to a thin slat for the master model 30 in the rubber mold 114 (FIG. 24(c)).

Next, the casting mold 215 that is a reverse mold of the rubber mold 114 where the fourth ventlid 2d before bending is provided is manufactured (FIG. 24(d)). In this event, the fourth ventlid 2d before bending is provided so as to be embedded on the side with the shell-shaped plate member 9a'. The casting mold 115 is a material that does not deform or damage the rubber mold 114 and is formed from a material, for example plaster or ceramic, to facilitate the casting of metals used in molds.

Next, a casting (mold) 116 that is a reverse mold is produced from aluminum or iron using a casting mold 115. In this event, the fourth ventlid 2d before bending is provided so as to be embedded on the side with the rectangular plate member 9b (FIG. 24(e)).

Next, the venthole 118 is formed by machining using a drill and the like so as to pass air to the external portion of the mold (FIG. 24(f)). In addition, other methods of cast removal besides machining using the drill and the like may be used for formation of the venthole 118.

Next, the fourth ventlid 2d is bent to a predetermined angle (FIG. 24(g)). In this manner, as is shown in FIG. 24(h), the fourth ventlid 2d can be directly fixed to a predetermined location in the sub-mold.

The fourth ventlid that is fixed to a sub-mold as indicated in FIGS. 23(a) to 23(j) and FIGS. 24(a) to 24(i) is one having a lid mechanism with contents that maintain, with pressing of the green tire 11 on respective surfaces of the sub-mold 10a during tire molding (compression molding), an open state of rising after separation until the green tire 11 contacts an upper portion of the fourth ventlid 2d and the air 18 is discharged from the blockades 12 through a venthole 1 (FIG. 25(a)). From when the green tire 11 contacts the upper portion until it reaches the surface of the sub-mold 10a, the degree of springing up after separation is reduced and the air 18 is discharged from the blockades 12 (FIG. 25(a)), and outflow of the green tire 11 is prevented with the closed state produced by such contact where spring up after separation is eliminated without gaps when the green tire 11 reaches the surface of the sub-mold 10a (FIG. 25(b)). Further, the tire (the vulcanized tire) is removed from the mold after compression molding and vulcanization are complete. In this event, the upper portion of the fourth ventlid 2d separates and rises by means of spring action to connect the venthole 1 and the blockades 12 (FIG. 25(c)). This lid mechanism is provided in all ventlids from the first ventlid to the seventh ventlid mentioned later.

Shown in FIG. 26(a) is a process of manufacturing a mold using a fourth ventlid 2d' wherein a method using "sipe blades" for fixation is employed. In addition, as shown in FIGS. 26(a) to 26(e) and FIGS. 27(a) and 27(b), the use of a ventlid 2d' formed by bending (folding to produce a peak) the keyhole-shaped plate member 9 (9a, 9b') where a circle and thin rectangle lay in a line in a joint portion 9c' incorporated in the rectangle from a straight line portion 9c where the circle and thin rectangle lay in a line. This method via "fixture to sipe blades" is particularly effective when a venthole is provided at very near position to sipe blades in the body of the mold.

First, ventholes 118 are formed by machining using a drill and the like so as to pass air to the external portion of the mold in a predetermined location in the mold (casting) 116 where multiple sipe blades 36 are partially embedded between tips for cast removal 35 (FIG. 26(a) to (b)). In addition, other methods of cast removal besides machining using the drill and the like may be used for formation of the venthole 118.

Next, the circular plate member 9a is put in place so as to cover the venthole 118 (FIG. 26(c)) while the rectangular plate member 9b' of the fourth ventlid 2d' is fastened to a sipe blade 36. The rectangular plate member 9b' of the fourth ventlid 2d' is welded to the sipe blade and fixed (FIG. 26(d)). Any methods of welding, for example, resistance welding, spot welding, and percussion welding, may be used as welding methods in this event. In this manner, as shown in FIG. 26(e), the fourth ventlid 2d can be directly fixed to a predetermined location in the sub-mold via the sipe blades 36.

By means of this configuration, measures can be used for embedding of the ventlid in the body of the mold without requiring man-hours for special preparations and production costs can be reduced. Further, fixture work close to the mold surface can be performed in comparison to other methods in small gaps in the mold where sipe blades are present in an extremely high level of density as in molds for stud-less tires, and simple and reliable measures can be provided.

Fifth ventlid

The fifth ventlid is one corresponding to changes in the shape of a plate member conforming to the design of the shape of the periphery of a tire with respect to the shape of the first through fourth ventlids based on use of a plate member with a completely circular shape and the like.

Figures 28A, 28B:
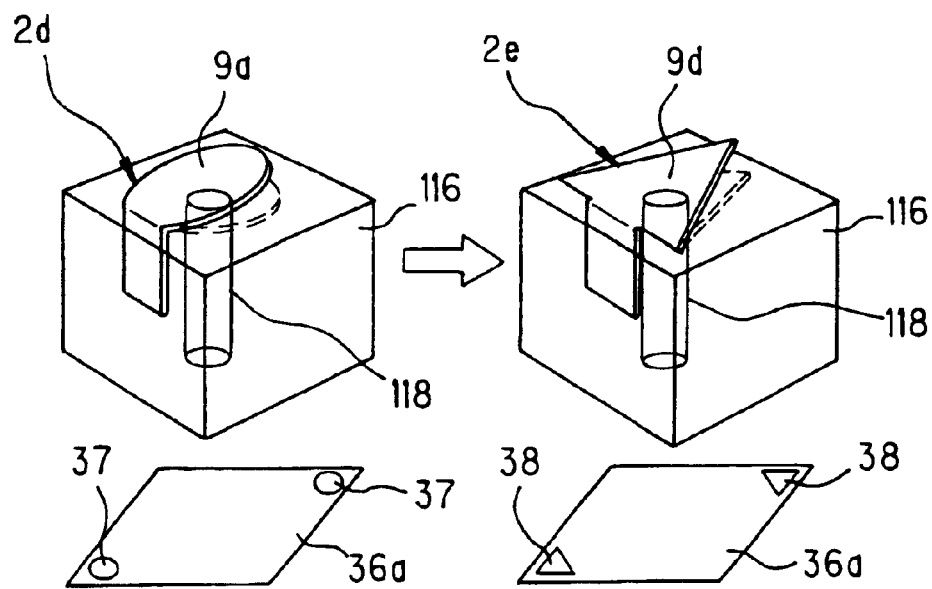
FIGS. 28(a) and 28(b) show an explanatory drawing to schematically indicate the fifth ventlid used in one of preferred embodiments of the mold for molding a tire in the present invention.

Indicated in FIG. 28(a) are impressions 37 of the fourth ventlid 2d on a block design 36a for a production tire and the installation in the body of the mold 116 having the venthole 118 for the fourth ventlid 2d using the circular plate member 9a. In contrast, shown in FIG. 28(b) are impressions 38 of the fifth ventlid 2e on the block design 36a for a production tire and the installation in the body of a mold 116 having the venthole 118 for the fifth ventlid 2e using a triangular plate member 9d, for example, conforming to the design of the shape of the periphery of a tire.

As shown in FIG. 28(b), certainty with respect to the tire design (block design) can be increased with the shape of the ventlid impression by means of a fifth ventlid 2e with consideration of the tire's external quality.

Sixth ventlid

The sixth ventlid is one corresponding to changes in the surface shape of a plate member conforming to the surface shape of the mold with respect to the surface shape of the first through fourth ventlids based on use of a plate member with a completely level surface.

Shown in FIG. 29(a) is the installation in the body of the mold 116 having projections and depressions 39 in the surface, the venthole 118, and a counterboring 40 for the fourth ventlid 2d using the circular plate member 9a. In this event, the surface shape of the body of the mold 116, with only the portion where the fourth ventlid 2d is provided being a level surface shape, does not conform to the projection and depression shapes of the entire surface. In contrast, shown in FIG. 29(b) is the installation in the body of the mold 116 having the venthole 118 for the sixth ventlid 2f using a plate member 9e having a surface shape corresponding to the surface shape of the mold 116 having projections and depressions 39 in the surface.

The sixth ventlid 2f indicated in FIG. 29(b) can be produced as shown in FIG. 30 by means of press bending and forming so as to have projection and depression shapes 41 corresponding to the surface shape of the mold 116 on the circular plate member 9a. Production by machining of a bending mold in advance when molding a ventlid by press bending and forming may also be used, and production via casting using an original mold (master model) produced when casting the body of a tire mold may also be used. Furthermore, measures using as a bending mold a mold where a ventlid is provided may also be used.

As shown in FIG. 29(b), certainty with respect to the surface shape of the mold as a whole can be increased by means of the sixth ventlid 2f with consideration of the surface shape of the mold.

Seventh ventlid

The seventh ventlid is one corresponding to changes in the surface shape of a plate member conforming to the surface shape of the mold in the same manner as the sixth ventlid by means of fixture to a shaped component having a shape corresponding to the surface shape of a mold with respect to the surface shape of the first through fourth ventlids based on use of a plate member with a completely level surface.

Shown in FIG. 31 is the installation in the body of a mold 116 having projections and depressions 39 in the surface, the venthole 118, and the counterboring 40 for the seventh ventlid 2g where a shaped component having a shape corresponding to the surface shape of a mold 116 is fixed by means an adhesive agent or welding on top of the circular plate member 9a.

The seventh ventlid 2g shown in FIG. 31 has, as shown in FIG. 32, a shaped component 42 produced in advance from a resin or a metal with the shape of the outer periphery corresponding to the counterboring 40 (refer to FIG. 31) formed in the surface of the mold 116 and the surface shape corresponding to the surface shape of the body of a mold (projection and depression shapes 39). This can be produced by fixture to the top of the circular 9a via, for example, an adhesive agent or welding. In addition, a forming mold produced by production methods other than machining in advance, casting, and the like may be used for production of a shaped component 42. Measures for direct machining of the shaped component may also be used.

As shown in FIG. 31, certainty with respect to the surface shape of the mold as a whole can be increased by means of the seventh ventlid 2g with consideration of the surface shape of the mold.

Measures to improve the service life (strength) of the opening and closing lid portion (plate members 2a, 8a, 9a, 9a', 9e, and the like) in the lid mechanism of the ventlid itself can be used for the configuration of the plate member 9a where the shaped component 42 is fixed in the seventh ventlid or the plate member 9e having projections and depressions in the surface in the sixth ventlid.

Ordinarily, tire molds are used repeatedly, and constituents included in the tire form portions of oils and fats on the mold surface, namely "contamination" adheres to it. In this event, use of "blasting" that blows media of glass beads, metal balls, dry ice pellets, and the like with high-pressure air is generally performed to remove this contamination. In the event the ventlid used in the present invention is one made of metal, tab thickness is extremely thin being approximately 0.02–0.2 mm, so the opening and closing lid portion of the ventlid can unfortunately be deformed into a curved shape. There is also the risk of being unable to deliver initial performance. As countermeasures, a strong shape can be used for the ventlid itself or reinforcing material may be provided, but the sixth and seventh ventlids must be suited to these countermeasures.

In the event of reinforcing of the lid portion of the ventlid using the configuration of the sixth ventlid, press bending to a shape so as to have a larger section modulus for the lid as shown in FIGS. 33(a) and 33(b) can be used.

Further, in the event of reinforcing of the lid portion of the ventlid using the configuration of the sixth ventlid, as a matter of course metal such as steel material may be used as the material of the shaped component attached to the lid, but an elastomer that is highly blast-durable may also be used. In addition, in the event metal is used for the material of the shaped component, it grows and shrinks due to blast media and a phenomenon where it is gradually chipped away will occur, but in the event elastomer is used, a state with almost no accumulation of damage due to blasting can be maintained via selection of appropriate materials.

Characteristic portions in the respective configurations for the first through seventh ventlids may also be used jointly.

In addition, infiltration of rubber burrs can be more effectively prevented by means of intentionally roughening surfaces by blasting and the like for surface roughness of the leakage distance (the distance from the outer peripheral wall of the lid opening and closing surface [opening and closing lid portion] to the hole for air removal [venthole]) portion of the body of a mold or the ventlid.

EMBODIMENTS

Embodiments according to the present invention will hereinafter be described in detail, but the present invention is in no way limited by these embodiments.

Embodiment 1

A mold divided into 7 units (a configuration of 1 set of a complete mold with 7 sub-molds 10(a) along the circumference using segmented molds as shown in FIGS. 1(a) and 1(b) are produced via aluminum alloy casting methods (plaster casting methods) (material: foam plaster and aluminum alloy material AC4C (Si 7%, Cu 0.8%, Mg 0.4%, and Al as the remainder) using a plaster cast. In this event, the initial setting for the number of individual ventholes is 1376 per set.

Next, into a sub-mold 200a where a venthole 201 and a counterboring 205 as shown in FIG. 34(a) are formed via machining with the production process is inserted as shown in FIGS. 34(d) to 34(f) a positioning tube 204 (material: SUS304) as shown in FIGS. 34(a) to 34(f) and a ventlid 202 (material: SUS304) having a lid 203 as shown in FIG. 34(b). In this event, the positioning tube 204 is provided by caulking in a sub-mold 200a (FIG. 34(d)), the ventlid 202 is put in place on top of the positioning tube 204 (FIG. 34(e)), and the outer peripheral portion of the ventlid 202 and the positioning tube 204 are fixed by percussion welding (FIG. 34(f)).

With continuous molding of a tire using a mold produced in this manner, air inclusion defects did not occur and a tire was formed with almost no burrs in the ventlid portion. However, concave impressions of about 0.05–0.15 mm remained in locations corresponding to the lid portion of the ventlid in the tire. Maintenance of the air removal characteristics was confirmed even after continuous molding of 20000 tires.

Embodiment 2

As shown in FIGS. 35(a) to 35(c), a mold for molding a tire as indicated in Embodiment 1 was produced in the same manner as Embodiment 1 with the exception of changing the depth of the counterboring 205 of the sub-mold 200a to 3.10 mm, the diameter of the lid 203 of the ventlid 202 to 2.0 mm, and the tab thickness to 0.1 mm.

With continuous molding of a tire using a mold produced in this manner, air inclusion defects did not occur and a tire was formed with almost no burrs in the lid portion of the ventlid.

Further, concave impressions in locations corresponding to the lid portion of the ventlid in the tire in this event fell below 0.05 mm and a satisfactory external appearance and quality in comparison to Embodiment 1 were obtained.

Further, maintenance of the air removal characteristics was confirmed even after continuous molding of 20000 tires.

Embodiment 3

Figure 36A:
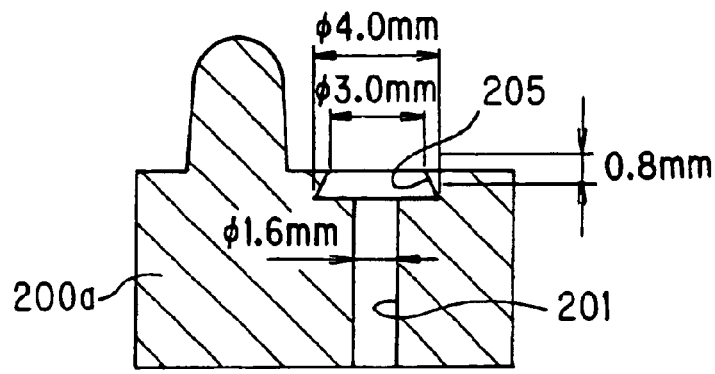
FIGS. 36(a) to 36(d) show an explanatory drawing to schematically indicate the structural elements used in another embodiment of the mold for molding a tire in the present invention, where (a) is the sub-mold, (b) is the first ventlid, and (c) to (d) are respective being installed (insertion).
Figure 36B:
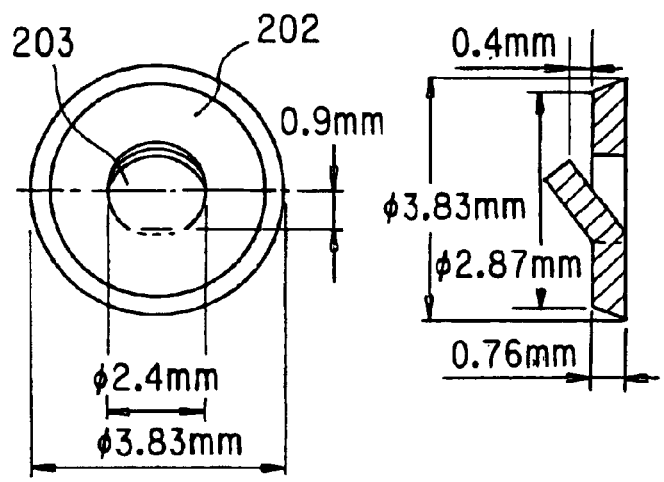

As shown in FIGS. 36(a) to 36(d), a mold for molding a tire as indicated in Embodiment 1 was produced in the same manner as Embodiment 1 with the exception of changing the shape of the counterboring 205 of the sub-mold 200a to an undercut by cast removal and production of the shape of the ventlid 202 as shown in FIG. 36(b) with an additive silicon rubber (Toray Silicone, brand name: SH9555).

Figures 36C, 36D:
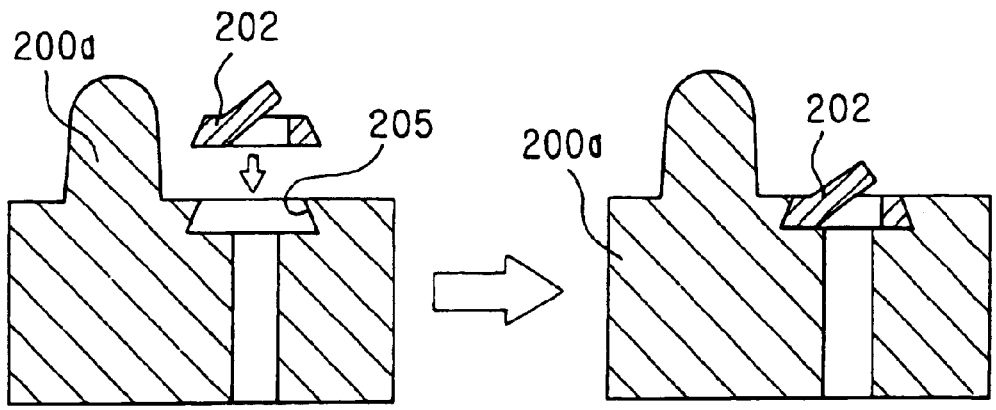

In this event as shown in FIGS. 36(c) to 36(d), the ventlid 202 was inserted in a sub-mold 200a using an undercut. With continuous molding of a tire using a mold produced in this manner, air inclusion defects did not occur and a tire was formed with almost no burrs in the lid portion of the ventlid.

Further, there were almost no concave impressions in locations corresponding to the lid portion of the ventlid in the tire in this event. Further, maintenance of the air removal characteristics was confirmed even after continuous molding of 20000 tires.

Embodiment 4

Figure 37A:
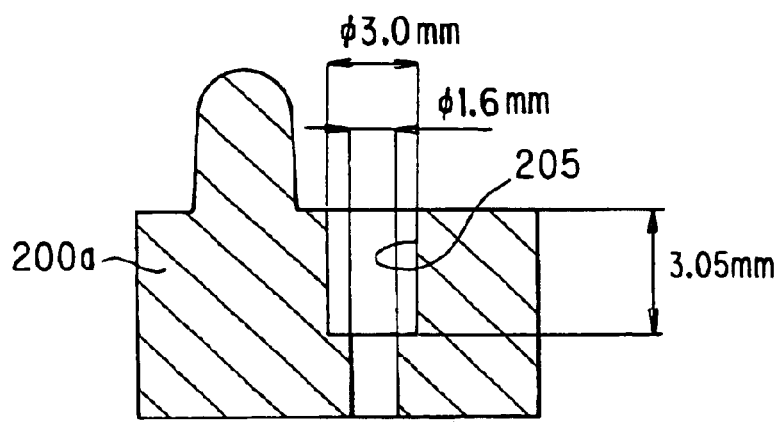
FIGS. 37(a) to 37(c) show an explanatory drawing to schematically indicate the structural elements used in other embodiments of the mold for molding a tire in the present invention, where (a) is the sub-mold, (b) is the second ventlid, and (c) is the vent tube.
Figures 37B, 37C:
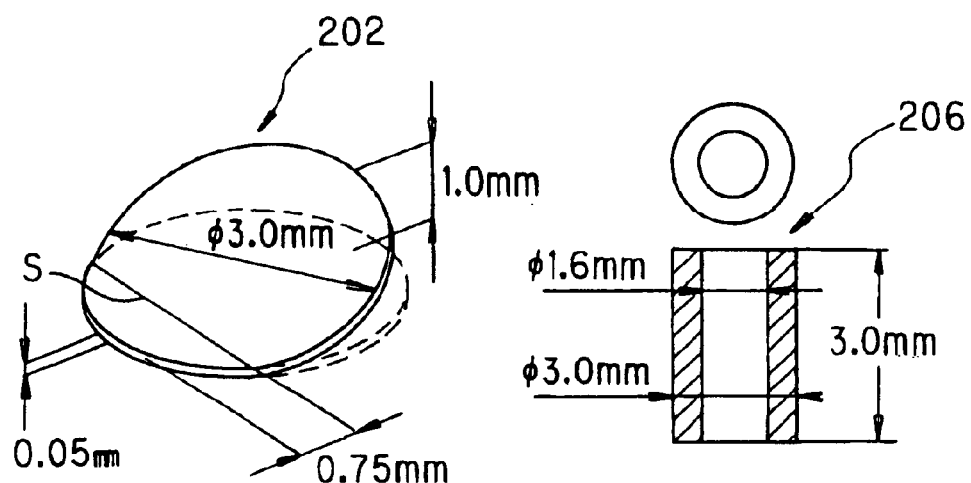

As shown in FIG. 37(a), a mold for molding a tire as shown in Embodiment 1 was produced in the same manner as Embodiment 1 with the exception of changing the shape of the counterboring 205 of the sub-mold 200a, production of the shape of the ventlid 202 as shown in FIG. 37(b) with SUS631, and production of a vent tube 206 with SUS304. In addition, cuts were not formed in the ventlid 202, so the interval between s became the length transversing the ventlid 202. In this event, the ventlid welded (percussion welding) in advance to the vent tube 206 was inserted in a mold counterboring portion as shown in FIG. 14 and fixed by a method of caulking. With continuous molding of a tire using a mold produced in this manner, air inclusion defects did not occur and a tire was formed with almost no burrs in the lid portion of the ventlid. Further, there were almost no concave impressions in locations corresponding to the lid portion of the ventlid in the tire in this event. Furthermore, maintenance of the air removal characteristics was confirmed even after continuous molding of 20000 tires.

Embodiment 5

Figure 38A:
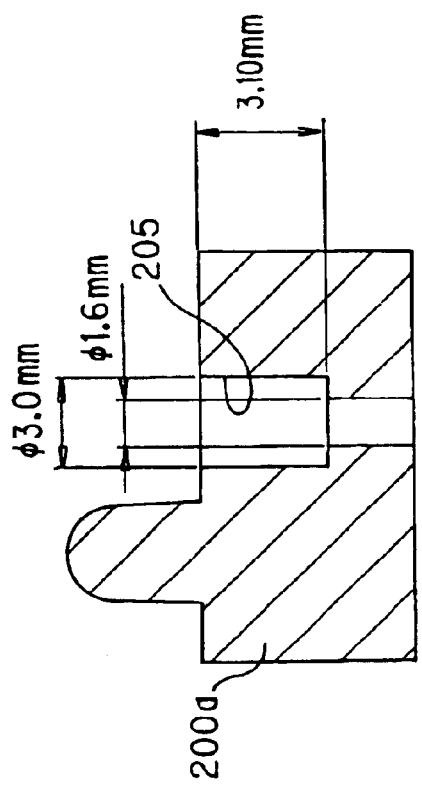
FIGS. 38(a) to 38(d) show an explanatory drawing to schematically indicate the structural elements used in another embodiment of the mold for molding a tire in the present invention, where (a) is the sub-mold, (b) is the third ventlid, (c) is the vent tube, and (d) is the amount of opening after welding and bending.
Figure 38D:
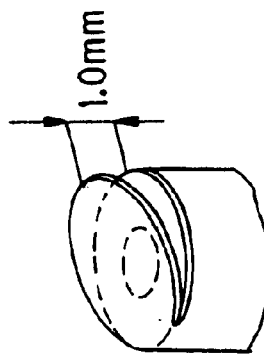
Figure 38C:
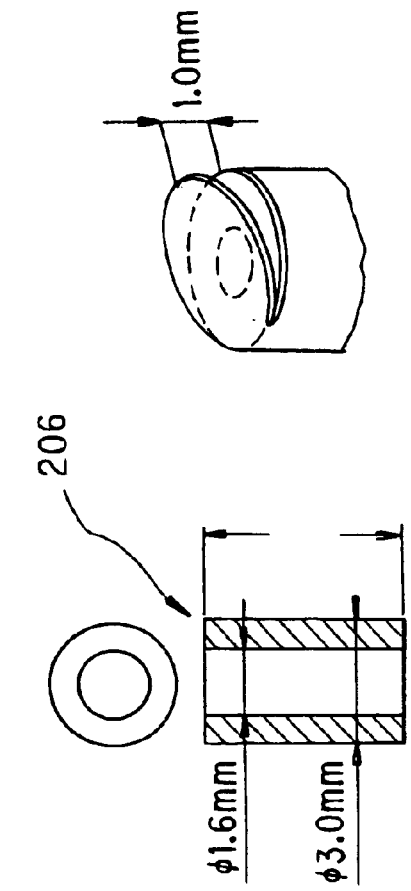
Figure 38B:
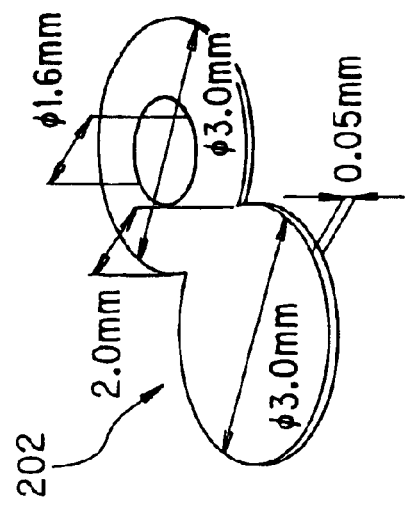

As shown in FIG. 38(a), a mold for molding a tire as shown in Embodiment 1 was produced in the same manner as Embodiment 1 with the exception of changing the shape of the counterboring 205 of the sub-mold 200a, production of the shape of the ventlid 202 as shown in FIG. 38(b) with SUS631, and production of the vent tube 206 with SUS304. In this event, the ventlid welded (percussion welding) in advance to the vent tube 206 was inserted in a mold counterboring portion as shown in FIGS. 14(a) to 14(e) and fixed by a method of caulking. In addition, the amount of opening as shown in FIG. 38(d) after welding of the ventlid 202 to the vent tube 206 was 1.0 mm. With continuous molding of a tire using a mold produced in this manner, air inclusion defects did not occur and a tire was formed with almost no burrs in the lid portion of the ventlid. Further, there were almost no concave impressions in locations corresponding to the lid portion of the ventlid in the tire in this event. Furthermore, maintenance of the air removal characteristics was confirmed even after continuous molding of 20000 tires.

Embodiment 6

Figure 39A:
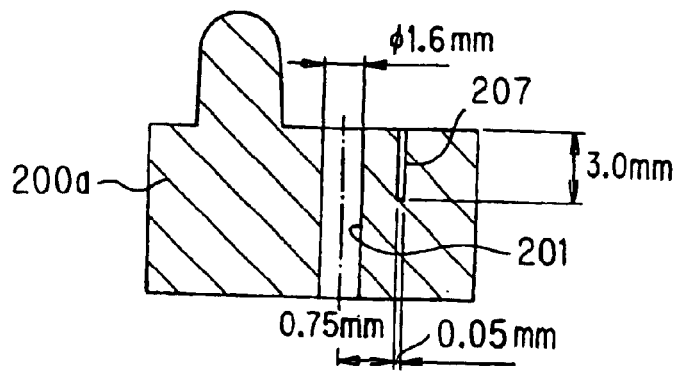
FIGS. 39(a) and 39(b) show an explanatory drawing to schematically indicate the structural elements used in still another embodiment of the mold for molding a tire in the present invention, where (a) is the sub-mold and (b) is the fourth ventlid.
Figure 39B:
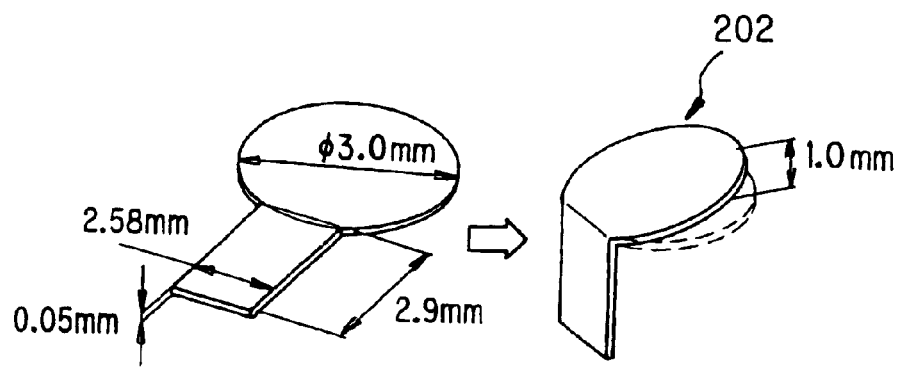

As shown in FIG. 39(a), a cast removal groove 207 with a thickness of 0.05 mm, a width of 2.6 mm, and a depth of 3.0 mm was produced by a mold production process (refer to FIG. 23) immediate to the opening of the venthole 201 in Embodiment 1 and the venthole 201 was opened to φ1.6 mm. After this, a ventlid 202 produced in advance as shown in FIG. 39(b) was inserted and caulked in a cast removal groove of the mold (see FIG. 23(a) to (j)). In addition, SUS631 was used as the material for the ventlid 202. With continuous molding of a tire using a mold produced in this manner, air inclusion defects did not occur and a tire was formed with almost no burrs in the lid portion of the ventlid. Further, there were almost no concave impressions in locations corresponding to the lid portion of the ventlid in the tire in this event. Furthermore, maintenance of the air removal characteristics was confirmed even after continuous molding of 20000 tires.

Embodiment 7

Figure 40:
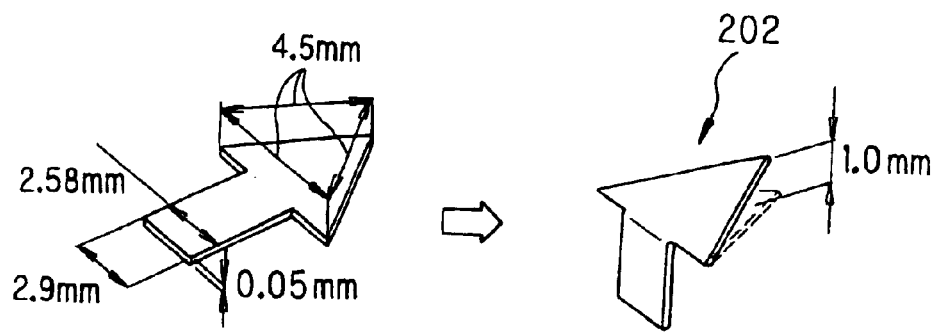
FIG. 40 shows an explanatory drawing to schematically indicate the fifth ventlid used in still another embodiment of the mold for molding a tire in the present invention.

As shown in FIG. 40, the shape of the ventlid in 202 in Embodiment 6 was changed and a mold was completed. In addition, SUS631 was used as the material for the ventlid 202. A tire mold produced in this manner, by means of the shape of the contours of the lid portion of the ventlid readily corresponding to the block design of the tire and the design that was lightly transcribed to the molded tire after displaying characteristics equivalent to those in Embodiment 6, had increased certainty.

Embodiment 8

Figure 41A:
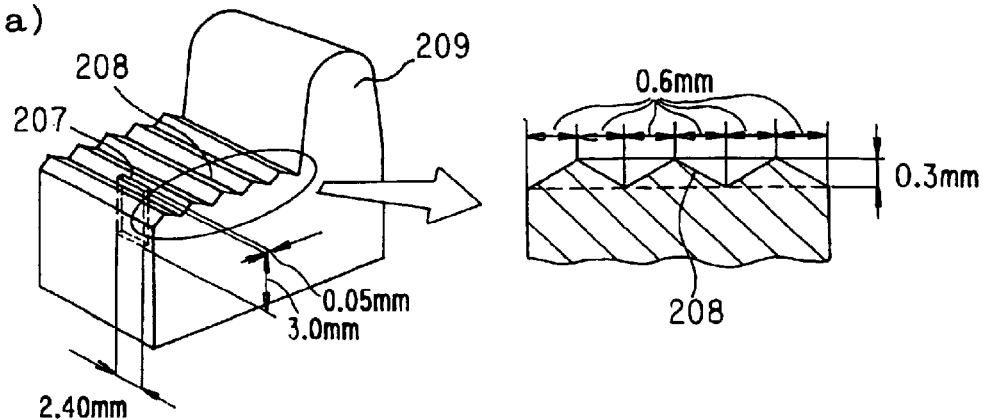
FIGS. 41(a) to 41(d) show an explanatory drawing to schematically indicate the structural elements used in still another embodiment of the mold for molding a tire in the present invention, where (a) is the sub-mold, (b) is the positional relationship between cast removal grooves and a venthole, (c) is the sixth ventlid, and (d) is the sub-mold with the sixth ventlid in an inserted state.
Figure 41B:
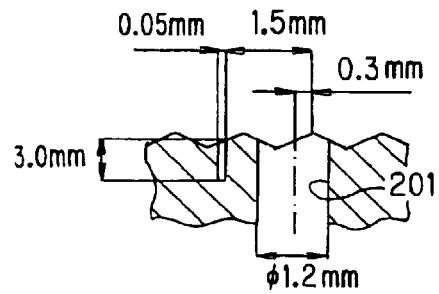
Figure 41C:
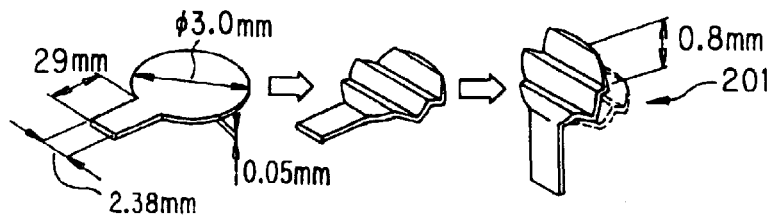
Figure 41D:
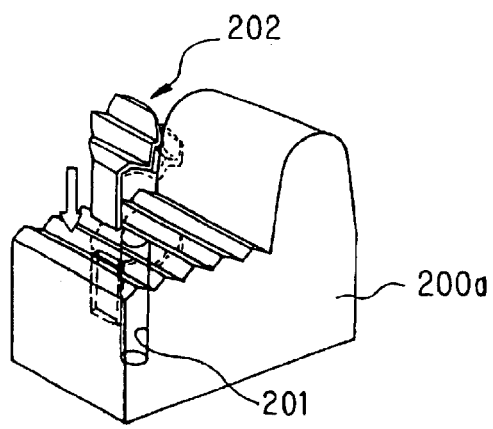

As shown in FIGS. 41(a) to 41(d), projection and depression shapes 208 were added to the surface of a mold profile (FIG. 41(a)) and a cast removal groove 207 with a width of 2.40 mm, a depth of 3.0 mm, and a thickness of 0.05 mm was incorporated immediate to the opening of the venthole 201 in Embodiment 6 using a method indicated in FIG. 23 with a positional relationship as indicated in FIG. 41(b). After this, the venthole 201 was opened to φ1.2 mm. In addition, SUS631 was used as the material for the ventlid 202. Here, notation 208 indicates a cast removal tip. After inserting the ventlid 202 as shown in FIG. 41(c) in the mold prepared in this manner, a tire mold was produced by caulking in the body of the mold 200a (FIG. 41(d)). A tire mold produced in this manner, by means of the shape of the contours of the lid portion of the ventlid readily corresponding to the block design of the tire and the design that was lightly transcribed to the molded tire after displaying characteristics equivalent to those in Embodiment 6, had increased certainty.

Embodiment 9

Figure 42A:
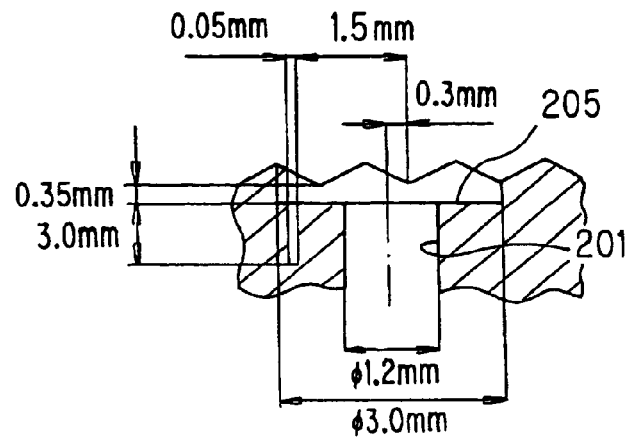
FIGS. 42(a) to 42(c) show an explanatory drawing to schematically indicate the structural elements used in still another embodiment of the mold for molding a tire in the present invention, where (a) is the venthole portion of the sub-mold, (b) is the seventh ventlid where the shaped component is attached, and (c) is the sub-mold with the seventh ventlid in an inserted state.
Figure 42B:
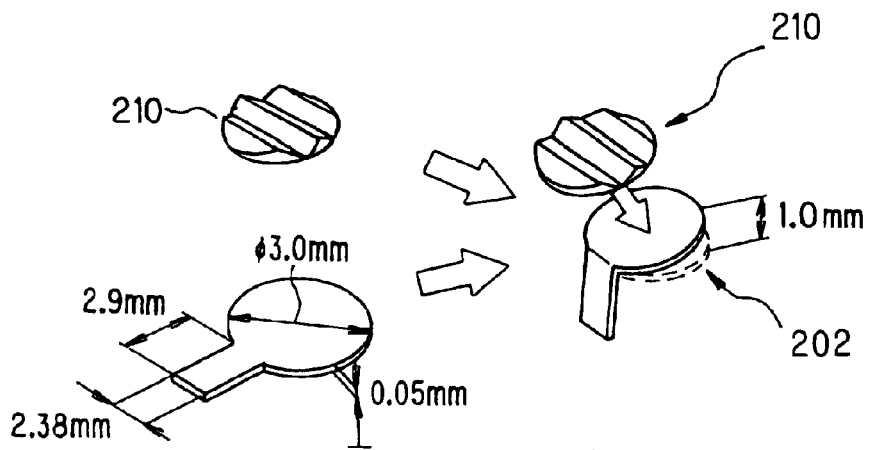
Figure 42C:
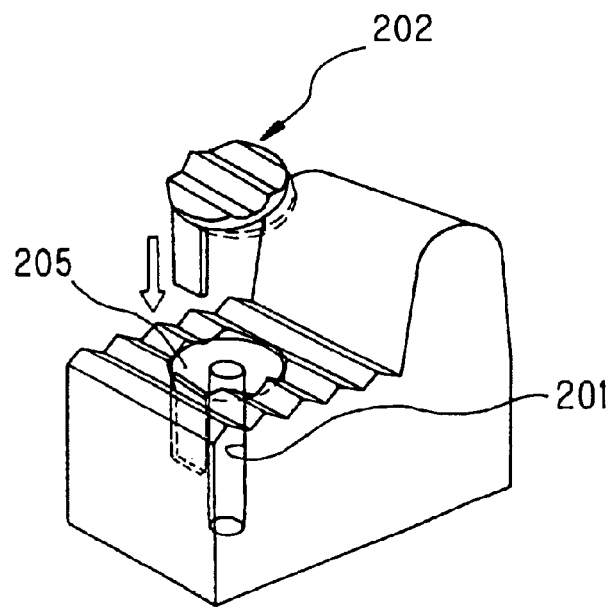

As shown in FIGS. 42(a) to 42(c), processing of the counterboring 205 of φ3 mm as shown in FIG. 42(a) was performed during processing of the venthole in the body of the mold in Embodiment 8. The ventlid 202 used as shown in FIG. 42(b) is cast molded of an additive silicone rubber (Toray Silicone, brand name: SH9555) with a projection-and-depression-shaped part (shaped component) of the same shape as that removed from the portion with the counter-boring 205 in the upper portion of the lid. After application of a resin adhesive agent, a projection-and-depression-shaped part is attached to the opening and closing lid surface of the ventlid 202 in a state before hardening of the additive silicon rubber applied, and the surface shaping is performed. In addition, SUS631 was used as the material for the ventlid 202. As shown in FIG. 42(c), a ventlid 202 produced in this manner is inserted in the body of the mold 200a and the tire mold is completed with caulking of the ventlid 202 in the body of the mold 220a. A tire mold produced in this manner displayed air removal characteristics and external appearance characteristics equivalent to those in Embodiment 8.

Further, ventlid blasting durability is considerably improved in this instance in comparison to the instance in Embodiment 8. Namely, silica sand having an average grain size of #180 is the blast medium, pressure is 7 kgf/cm$^2$, the nozzle aperture is $\phi$10 mm, and the distance from the nozzle aperture to the ventlid is 15 cm in a blasting location. In Embodiment 8, continuous blasting exposure is approximately 30 sec., and sagging of the ventlid unfortunately deforms it. With respect to the opening and closing lid that does not function, the ventlid in Embodiment 9 was not deformed or damaged even with 3 min. of continuous blasting exposure with blasting under the same conditions. With regard to this blasting durability, Embodiments 4 through 7 were all only able to withstand blasting under the same conditions for approximately 15 sec. In addition, ventlid damage does not occur in Embodiments 4 through 8 if a method of directional energy processing such as excimer laser and the like is used during actual mold cleaning.

As explained previously, the occurrence of spew (whisker projections) and burred extensions on a tire surface during tire molding is prevented by means of the present invention. The mold for molding a tire can provide good initial performance and external appearance of the tire obtained, and therefore, the reduction in the production cost thereof, and the simplification in maintenance and inspection work are attained by the present invention.

What is claimed is:

1. A mold for molding a tire, comprising:
   at least two sub-molds, each said sub-mold comprising a portion of a whole, predetermined shape of said mold, and each said sub-mold further comprising:
   a plurality of air removal apertures formed on an interior surface of said sub-mold, each of said apertures being in communication with an exterior surface of said sub-mold such that air is discharged from blockades between a green tire present in said mold and said interior surface of said sub-mold; and
   a plurality of ventlids corresponding to each said aperture, each said ventlid comprising an integral lid mechanism, said lid mechanism comprising a resilient, chemically inactive material that does not fuse with the green tire and having sufficient durability to withstand repeated use at a temperature of 100–200° C.;
   wherein the entirety of each said ventlid is positioned above a respective one of said apertures;
   wherein said lid mechanism maintains a range of open positions by virtue of the resiliency of said lid mechanism such that air is discharged from said blockade via said aperture while said lid mechanism is in any one of said open positions, and wherein said lid mechanism assumes a closed position upon sufficient contact with the green tire in said mold, thereby sealing said aperture such that air and green tire material are prevented from entering said aperture.

2. The mold of claim 1, wherein said ventlid further comprises a flexible plate member and said lid mechanism is defined by a plurality of cuts passing through said ventlid in a perpendicular direction to a surface plane of said ventlid and a lid mechanism baseline;
   wherein at least two of said cuts each extend from a substantially opposed portion of a peripheral edge of said ventlid inwardly toward a respective terminal point such that said lid mechanism baseline is defined between said terminal points of said cuts; and
   wherein said lid mechanism extends outwardly from said lid mechanism baseline at a predetermined angle and away from said surface of said ventlid.

3. The mold of claim 2, wherein said ventlid is fixed to a vent tube via a weld site positioned between a portion of said peripheral edge of said ventlid and said lid mechanism baseline, and wherein said vent tube is disposed in at least one of said apertures.

4. The mold of claim 2, wherein said ventlid is directly fixed to a portion of said interior surface of said sub-mold via a weld site positioned between a portion of said peripheral edge of said ventlid and said lid mechanism baseline.

5. The mold of claim 1, wherein said ventlid comprises a silicone elastomer or a fluorocarbon elastomer.

6. The mold of claim 1, wherein said ventlid comprises a flexible plate member comprising one or more of said integral lid mechanisms;
   each of said lid mechanisms being defined by at least one cut passing through said ventlid in a direction perpendicular to a surface plane of said ventlid and extending from a starting point that is spaced a distance inwardly from the periphery of said ventlid toward a terminal point that is spaced a distance inwardly from the periphery of said ventlid along one or more straight or curved lines, and a substantially straight, un-cut lid mechanism baseline extending from said starting point to said terminal point;
   wherein each of said lid mechanisms extend outwardly from a respective lid mechanism baseline at a predetermined angle and away from said surface plane of said ventlid.

7. The mold of claim 1, wherein each said sub-mold further comprises a vent channel in communication with a respective one of said apertures and said exterior surface of said sub-molds, and wherein each said sub-mold further comprises means for preventing said lid mechanism from being introduced into said aperture when said lid mechanism is in said closed position upon further contact with the green tire.

8. The mold of claim 7, wherein said means comprises a positioning pin disposed in said vent channel and extending in an axial direction of said vent channel from a support member provided in said vent channel toward a terminal end proximate said aperture, such that a lower surface of said lid mechanism is in intimate contact with said terminal end of said positioning pin when said lid mechanism is in said closed position.

9. The mold of claim 7, wherein said vent channel comprises a lip defined by an upper portion of a peripheral wall of said vent channel proximate said aperture; and
   wherein said means comprises said lip, such that a portion of a lower surface of said lid mechanism contacts said lip to prevent said lid mechanism from being introduced into said aperture when said lid mechanism is in said closed position upon further contact with the green tire.

10. The mold of claim 1, wherein said ventlid comprises a flexible plate member having a shape defined by a first portion and an adjacent second portion, said first and second portions being joined along a line defining a lid mechanism baseline; and wherein said lid mechanism is defined by said first portion and said lid mechanism baseline, such that said lid mechanism extends outwardly from said lid mechanism baseline at a predetermined angle.

11. The mold of claim 10, wherein each of said first and second portions of said ventlid are circular or elliptical, and said lid mechanism baseline comprises a tangent line between said first and second portions, said tangent line being substantially perpendicular to an imaginary line connecting a center point of each said first and second portions of said ventlid.

12. The mold of claim 11, wherein said second portion further comprises an opening in communication with said aperture.

13. The mold of claim 12, wherein said second portion of said ventlid is positioned such that said center point of said lid mechanism substantially coincides with said center point of said second portion of said ventlid when said lid mechanism is in said closed position.

14. The mold of claim 10, wherein said second portion of said ventlid is fixed to a vent tube at predetermined locations and wherein said vent tube is disposed in at least one of said apertures.

15. The mold of claim 10, wherein said second portion of said ventlid is directly fixed to said sub-mold at predetermined locations.

16. The mold of claim 13, wherein said second portion of said ventlid is directly fixed to said sub-mold at predetermined locations between a peripheral edge of said second portion of said ventlid and said opening thereof.

17. The mold of claim 10, wherein said first portion of said ventlid is circular, elliptical, semi-circular or semi-elliptical, and said second portion of said ventlid is rectangular.

18. The mold of claim 17, wherein said second portion of said ventlid is fixed to at least one of a plurality of sipe blades provided in predetermined locations on said sub-mold to secure said ventlid to said sub-mold.

19. The mold of claim 10, wherein said first portion of said ventlid has a shape defined by a design of the shape of a periphery of a tire, and said second portion of said ventlid is substantially rectangular.

20. The mold of claim 19, wherein said second portion of said ventlid is fixed to a vent tube at predetermined locations and said vent tube is disposed in at least one of said apertures.

21. The mold of claim 19, wherein said second portion of said ventlid is directly fixed to said sub-mold at predetermined locations.

22. The mold of claim 10, wherein said first portion of said ventlid has a surface contour shape that corresponds to a surface contour shape of said interior surface of said sub-mold.

23. The mold of claim 10, wherein said first portion of said ventlid further comprises a member having a surface contour shape that corresponds to a surface contour shape of said interior surface of said sub-mold disposed on an upper surface of said first portion of said ventlid.

* * * * *